US012650982B2

(12) United States Patent
Akidau et al.

(10) Patent No.: US 12,650,982 B2
(45) Date of Patent: Jun. 9, 2026

(54) QUERY REFRESH USING MULTIPLE PROCESSING PIPELINES

(71) Applicant: Snowflake Inc., Bozeman, MT (US)

(72) Inventors: Tyler Arthur Akidau, Seattle, WA (US); Fabian Hueske, Berlin (DE); Tyler Jones, Redwood City, CA (US); Daniel Mills, Seattle, WA (US); Leon Papke, Berlin (DE); Prasanna Rajaperumal, Bangalore (IN); Daniel E. Sotolongo, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/988,025

(22) Filed: Dec. 19, 2024

(65) Prior Publication Data

US 2025/0117382 A1      Apr. 10, 2025

Related U.S. Application Data

(63) Continuation of application No. 18/362,898, filed on Jul. 31, 2023, now Pat. No. 12,216,654, which is a continuation of application No. 17/931,590, filed on Sep. 13, 2022, now Pat. No. 11,762,855.

(60) Provisional application No. 63/366,197, filed on Jun. 10, 2022.

(51) Int. Cl.
*G06F 16/2453* (2019.01)
(52) U.S. Cl.
CPC .............................. *G06F 16/24539* (2019.01)
(58) Field of Classification Search
None
See application file for complete search history.

(56) References Cited

U.S. PATENT DOCUMENTS

| | | | | |
|---|---|---|---|---|
| 6,205,451 | B1 * | 3/2001 | Norcott | ............. G06F 16/24556 |
| 6,334,128 | B1 * | 12/2001 | Norcott | ............... G06F 16/2393 |
| | | | | 707/999.005 |
| 9,430,552 | B2 * | 8/2016 | Adya | .................... G06F 16/217 |
| 10,187,260 | B1 | 1/2019 | Chen et al. | |

(Continued)

OTHER PUBLICATIONS

"U.S. Appl. No. 17/931,590, Non Final Office Action mailed May 4, 2023", 10 pgs.

(Continued)

*Primary Examiner* — Christopher J Raab
(74) *Attorney, Agent, or Firm* — Schwegman Lundberg & Woessner, P.A.

(57) ABSTRACT

A system includes at least one hardware processor and at least one memory storing instructions that cause the at least one hardware processor to perform operations. The operations include generating a log of changes posted to a plurality of intermediate materialized tables (MTs) during execution of a query in a network-based database system. The query is associated with a source MT that the intermediate MTs depend on. The operations include rendering the log of changes into a dependency graph. The operations include configuring a plurality of processing pipelines based on the dependency graph. The operations include performing refreshes on one or more of the plurality of intermediate MTs in at least one of the plurality of processing pipelines to complete the refresh operation. The refreshes are performed responsive to detecting an instruction for a refresh operation on the source MT.

21 Claims, 21 Drawing Sheets

(56)     References Cited

U.S. PATENT DOCUMENTS

| | | | |
|---|---|---|---|
| 11,379,525 B1 | 7/2022 | Deutsch et al. | |
| 11,762,855 B1 | 9/2023 | Akidau et al. | |
| 2004/0122868 A1* | 6/2004 | Chan .................. | G06F 16/2365 |
| 2012/0054533 A1 | 3/2012 | Shi et al. | |
| 2012/0246179 A1 | 9/2012 | Garza et al. | |
| 2014/0379904 A1 | 12/2014 | Shimasaki et al. | |
| 2015/0149436 A1 | 5/2015 | Mckenna et al. | |
| 2015/0199415 A1* | 7/2015 | Bourbonnais .......... | G06F 16/27 |
| | | | 707/615 |
| 2017/0147671 A1* | 5/2017 | Bensberg .......... | G06F 16/24552 |
| 2019/0146970 A1 | 5/2019 | Chamieh et al. | |
| 2019/0392067 A1 | 12/2019 | Sonawane et al. | |
| 2023/0409574 A1 | 12/2023 | Akidau et al. | |

OTHER PUBLICATIONS

"U.S. Appl. No. 17/931,590, Notice of Allowance mailed Jul. 11, 2023", 8 pgs.

"U.S. Appl. No. 17/931,590, Response filed May 31, 2023 to Non Final Office Action mailed May 4, 2023", 12 pgs.

"U.S. Appl. No. 18/362,898, Non Final Office Action mailed Mar. 28, 2024", 11 pgs.

"U.S. Appl. No. 18/362,898, Notice of Allowance mailed Oct. 16, 2024", 8 pgs.

"U.S. Appl. No. 18/362,898, Response filed Jun. 28, 2024 to Non Final Office Action mailed Mar. 28, 2024", 12 pgs.

* cited by examiner

VIEW GRAPH

500

TASK GRAPH

*2000*

CREATE A MATERIALIZED TABLE USING A TABLE DEFINITION, THE TABLE DEFINITION INCLUDING A QUERY ON ONE OR MORE BASE TABLES AND A LAG DURATION VALUE, THE LAG DURATION VALUE INDICATING A MAXIMUM PERIOD THAT A RESULT OF A PRIOR REFRESH OF THE QUERY CAN LAG BEHIND A CURRENT TIME INSTANCE — 2002

DETERMINE A DELTA SET FOR THE ONE OR MORE BASE TABLES, THE DELTA SET COMPRISING AT LEAST ONE CHANGE APPLIED TO THE ONE OR MORE BASE TABLES SINCE THE PRIOR REFRESH OF THE QUERY — 2004

MERGE THE DELTA SET WITH THE MATERIALIZED TABLE TO PERFORM INCREMENTAL UPDATE OF THE MATERIALIZED TABLE — 2006

*FIG. 20*

QUERY REFRESH USING MULTIPLE PROCESSING PIPELINES

PRIORITY CLAIM

This application is a continuation of U.S. patent application Ser. No. 18/362,898, filed Jul. 31, 2023, and entitled "MATERIALIZED TABLE REFRESH USING MULTIPLE PROCESSING PIPELINES," which is a continuation of U.S. patent application Ser. No. 17/931,590, filed Sep. 13, 2022, and entitled "INCREMENTAL MAINTENANCE OF QUERY RESULTS," now issued as U.S. Pat. No. 11,762, 855, which claims the benefit of priority to U.S. Provisional Patent Application 63/366,197, filed Jun. 10, 2022, and entitled "DATABASE OBJECT TYPE FOR INCREMEN-TAL MAINTENANCE OF QUERY RESULTS," all of which are incorporated herein by reference in their entire-ties.

TECHNICAL FIELD

Embodiments of the disclosure relate generally to data-bases and, more specifically, to a database object type (e.g., a materialized table or MT) for incremental maintenance of query results.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented and others.

Databases are used by various entities and companies for storing information that may need to be accessed or ana-lyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional infor-mation may be stored in different tables of the same data-base. The retail company may need to "query" its database when it wants to learn information that is stored in the database. This retail company may want to find data about, for example, the names of all employees working at a certain store, all employees working on a certain date, all transac-tions for a certain product made during a certain time frame, and so forth.

When the retail store wants to query its database to extract certain organized information from the database, a query statement is executed against the database data. The query returns certain data according to one or more query predi-cates that indicate what information should be returned by the query. The query extracts specific data from the database and formats that data into a readable form. The query may be written in a language that is understood by the database, such as Structured Query Language ("SQL"), so the data-base systems can determine what data should be located and how it should be returned. The query may request any pertinent information that is stored within the database. If the appropriate data can be found to respond to the query, the database has the potential to reveal complex trends and activities. This power can be harnessed through the use of a successfully executed query. However, the configuration of queries and consuming changes to queries may be challeng-ing and time-consuming.

BRIEF DESCRIPTION OF THE DRAWINGS

The present disclosure will be understood more fully from the detailed description given below and from the accom-panying drawings of various embodiments of the disclosure.

FIG. 20 is a flow diagram illustrating operations of a database system in performing a method for performing incremental maintenance of query results, in accordance with some embodiments of the present disclosure.

DETAILED DESCRIPTION

Figure 1:
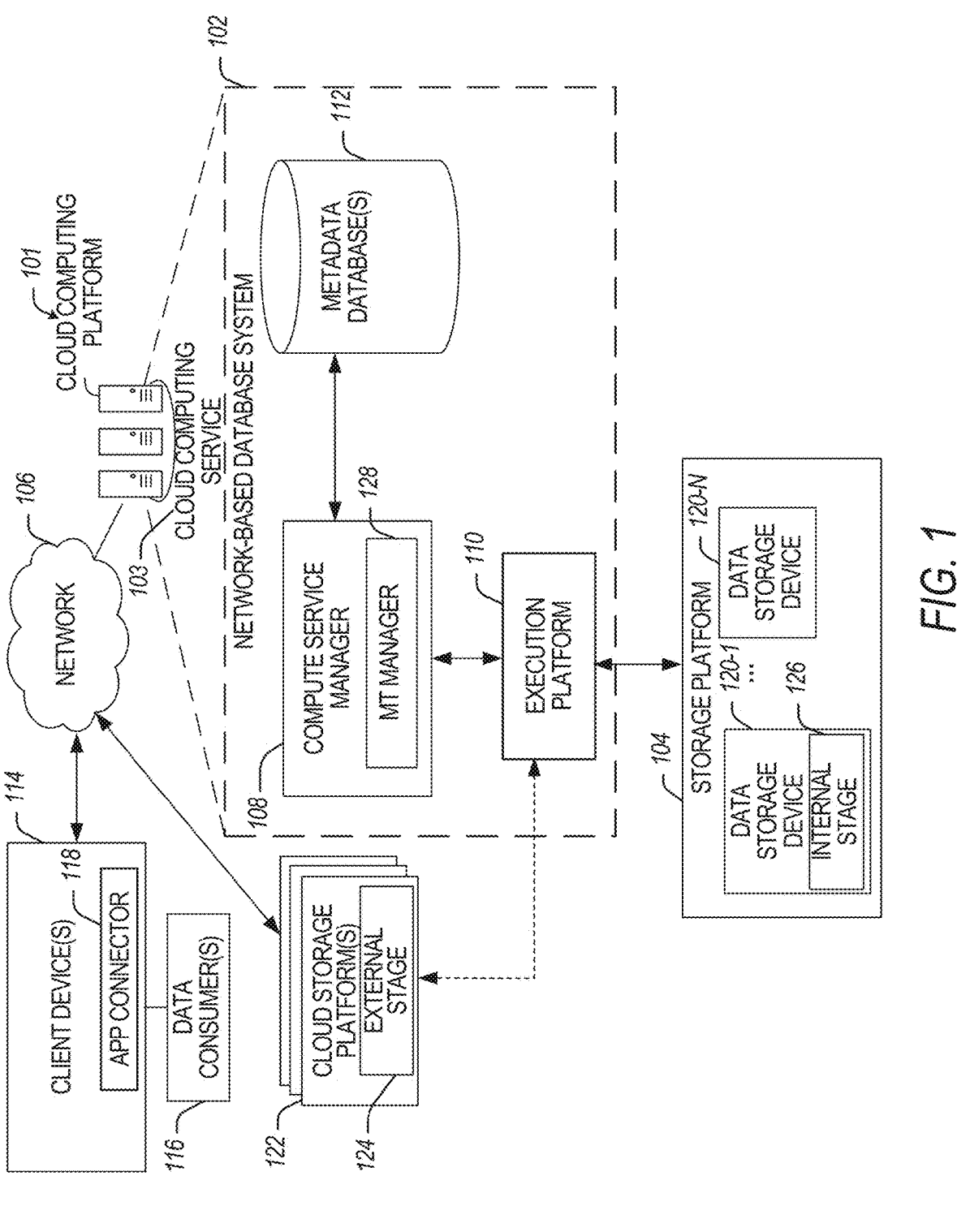
FIG. 1 illustrates an example computing environment that includes a network-based database system in communica-tion with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Aspects of the present disclosure provide techniques for configuring database object types (e.g., a materialized table, also referred to as MT) for incremental maintenance of query results. For example, the disclosed techniques may be performed by an MT manager in a network-based database system. In some embodiments, the MT manager can perform the disclosed techniques to configure MTs to compute changes in the results of a query, merge these changes into a table to perform an incremental update, store aggregates that can be incrementally updated, and break up complex queries into separate, inter-dependent tables (e.g., in connection with performing an incremental refresh).

As used herein, the term "table" indicates a mutable bag of rows, supporting time travel up to a retention period.

As used herein, the term "view" indicates a named SELECT statement, conceptually similar to a table. In some aspects, a view can be secure, which prevents queries from getting information on the underlying data obliquely.

As used herein, the term "materialized view" indicates a view that is eagerly computed rather than lazily (e.g., as a standard view). In some aspects, efficient implementation of materialized views overlaps with change tracking functionality.

As used herein, the term "CHANGES clause" indicates a syntactic modifier on a FROM clause indicating that a SELECT statement should return the changes that occurred to the specified table between two given times (docs). In some aspects, several different change types can be requested:

(a) the default type (also referred to as delta) finds the smallest set of changes that could account for the difference between the tables at the given times;

(b) the append-only type only finds rows that were appended to the table; and (c) the audit type (currently not public) computes all changes made between the given times, even if they cancel out.

In some aspects, MTs can be used to improve functionalities provided by tasks and materialized views (MVs). As used herein, the term "materialized table" (or MT) indicates data that is the result of a query, which can be periodically updated and queried. Tasks are powerful, but the conceptual model may limit their usability. Most use cases for tasks can be satisfied with tasks combined with stored procedures, streams, data manipulation language (DML), and transactions. Streams on views can be used to facilitate stateless incremental computations. Some drawbacks associated with tasks (which can be successfully addressed with MTs) include the following: (a) backfill workflows must be implemented and orchestrated manually; and (b) stateful operators (GroupBy, outer joins, windows) cannot be cleanly incremented by streams.

In some aspects, MVs can be used as query accelerators. Simple queries may be sufficient, and only aggregating operations are supported (e.g., no joins and no nested views are supported). Additionally, implementation costs may be insignificant, and less visibility and control may be exposed to users.

In some aspects, MTs can be used to target data engineering use cases. While MVs can support only aggregating operations (e.g., a single GroupBy on a single table), MTs remove query limitations and allow joining and nesting in addition to aggregation. Additional benefits of MTs include providing controls over cost and table refresh operations, automating common operations including incrementalization and backfill, and providing a comprehensive operational experience.

In comparison to other query processing techniques (e.g., extract-transform-load (ETL) and data pipeline solutions such as Airflow, Data Build Tool (DBT), streams, and tasks), the disclosed techniques are associated with the following additional advantages of using MTs: providing a declarative structured query language (SQL) interface to facilitate specifying the pipelines compared to preceding solutions; refreshes are performed incrementally (i.e., the cost scales with the size of the changes to inputs), reducing the cost compared to a "full refresh" solutions like the DBT development framework; incrementalization is done automatically, which results in simplifying the queries users have to write compared to traditional ETL systems like Airflow; MTs are integrated with the database, making it easier to access source data than in standalone query engines like Materialize; and MTs are similar to MVs, but targeted at the use case of building data pipelines, not accelerating interactive query workloads (compared to MVs, MTs impose fewer restrictions on allowed queries, but cannot be automatically substituted into queries like MVs).

The various embodiments that are described herein are described with reference, where appropriate, to one or more of the various figures. An example computing environment using an MT manager for configuring MTs to create, maintain, and consume cost-effective, continuous data pipelines and perform incremental maintenance of query results is discussed in connection with FIGS. 1-3. Example configuration and functions associated with the MT manager are discussed in connection with FIGS. 4-20. A more detailed discussion of example computing devices that may be used in connection with the disclosed techniques is provided in connection with FIG. 21.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122. The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the MT-related functions described herein). The cloud computing platform 101 may include a three-tier architecture: data storage (e.g., storage platforms 104 and 122), an execution platform 110, and a compute service manager 108 providing cloud services (e.g., services associated with using MTs for incremental maintenance of query results as well as configuring execution and consistency models for MTs using an MT manager 128).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/ or files of one or more other types-on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources including one or more storage locations within the cloud storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed MT-related functions) to multiple client accounts, including an account of the data provider associated with client device 114 and an account of the data consumer 116. In some embodiments, the compute service manager 108 comprises the MT manager 128 which can be used in connection with MT-related functions. Example MT-related functions include configuring MTs to compute changes in the results of a query, merge these changes into a table to perform an incremental update, store aggregates that can be incrementally updated, and break up complex queries into separate, inter-dependent tables (e.g., in connection with performing an incremental refresh). A more detailed description of the functions provided by the MT manager 128 is provided in connection with FIGS. 4-20.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed MT-related functions).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., MT-related functions) offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. The one or more data communication networks may utilize any communication protocol and any type of communication medium. In some embodiments, the data communication networks are a combination of two or more data communication networks (or sub-networks) coupled with one another. In alternate embodiments, these communication links are implemented using any type of communication medium and any communication protocol.

The compute service manager 108, metadata database 112, execution platform 110, and storage platform 104, are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
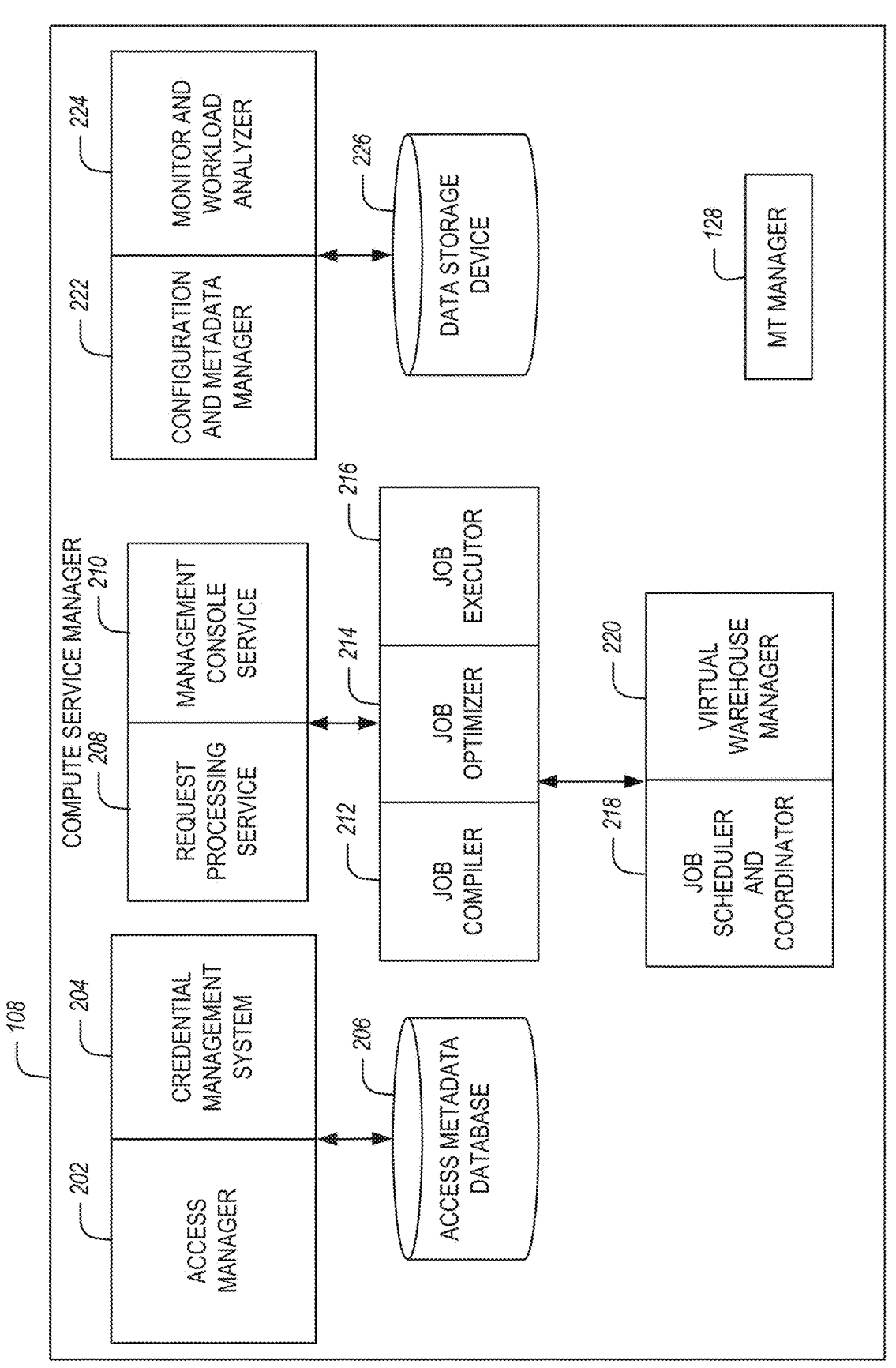
FIG. 2 is a block diagram illustrating the components of a compute service manager using an MT manager, in accor-dance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the MT manager 128 which can be used in connection with MT-related functions disclosed herein. The MT-related functions can include configuring MTs to compute changes in the results of a query, merge these changes into a table to perform an incremental update, store aggregates that can be incrementally updated, and break up complex queries into separate, inter-dependent tables (e.g., in connection with performing an incremental refresh).

Figure 3:
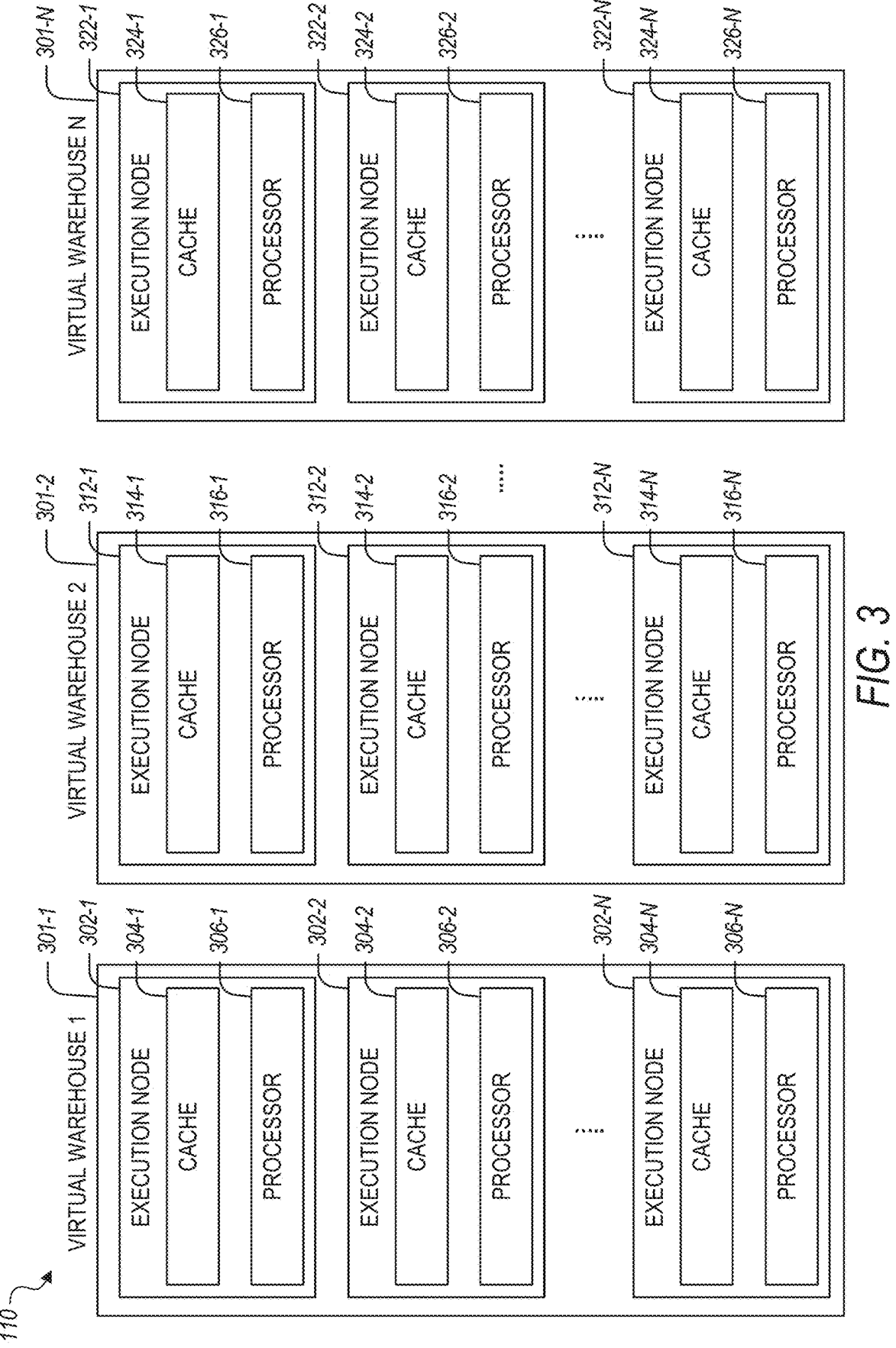
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed.

Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some aspects, MTs can be configured with the following capabilities:

(a) Incremental refresh: selection, projections (scalar functions), aggregations, and joins (inner, outer, semi, anti). In some aspects, MTs are refreshed incrementally (e.g., when the MTs contain the above-listed operations).

(b) Observability: In some aspects, a user interface (UI) with a simple view graph and account usage views can be used for monitoring.

(c) MT definition evolution can be used to configure a full refresh. In some aspects, MTs can continue functioning when they are replaced. However, updating may be based on a full (non-incremental) refresh. If consuming MTs are broken, updates may pause and an error may be generated.

(d) Shared data: In some aspects, MTs can read shared tables and views, and be shared themselves.

(e) Data transformation tool (e.g., DBT) integration: a custom DBT materialization for users can be used to adopt MTs in data transformation pipelines.

In some aspects, the disclosed techniques can be used to create MTs with the following configurations: minimum lag of 1 second; nesting depth, fan-in, and fan-out of up to 1000; incremental refreshes for partitioned window functions, subqueries, lateral joins, and recursive queries; integration with other data processing features including streams, row access policies, column masking policies, external tables, directory tables, external functions, user-defined functions (UDFs), and user-defined table functions (UDTFs); support for non-deterministic functions; an interactive UI for monitoring and debugging MT pipelines; incremental MT definition evolution when queries change compatibility; automatic query rewrites into MT scans; stream-like, "append-only" transformations; continuous DML features; merge performance optimizations; and using MTs to implement other features within a Snowflake.

In some aspects, MTs can be defined and orchestrated using data definition language (DDL) commands. For example, an MT can be created using the command CREATE MATERIALIZED TABLE <name> [LAG=<duration>] AS <query>. In this regard, an MT can be created using a query on one or more base tables and a lag duration (also referred to as a lag or a lag duration value). The lag duration value indicates a maximum period that a result of a prior refresh of the query can lag behind a current real-time instance (e.g., a current time which can also be referred to as a current time instance). The lag duration value can be configured as a required parameter.

In some aspects, the DDL command ALTER MATERIALIZED TABLE <name>{SUSPEND|RESUME} can be used to suspend or resume a refresh (e.g., to prevent refreshes without deleting MTs entirely).

In some aspects, the DDL command ALTER MATERI-ALIZED TABLE <name> REFRESH can be used for the manual orchestration of data pipelines. In some aspects, the DDL command SHOW MATERIALIZED TABLES can be similar to the command SHOW MATERIALIZED VIEWS, but with additional columns to show, e.g., lag, base tables, and maintenance plan. In some aspects, when the lag duration is set to infinity, the ALTER command can be used for a manual refresh.

In some aspects, the following DDL command configu-rations can be used with the disclosed MT-related tech-niques.

The following syntax may be used with the CREATE command for creating MTs: CREATE [OR REPLACE] MATERIALIZED TABLE <name> (<column_list>) [LAG=<duration>] AS<select>. LAG represents a lag dura-tion that the table is allowed to be behind relative to the current time. The term <select> indicates the view definition and may include a selection of both tables, views, projec-tions (scalar functions), aggregates, joins (inner, outer, semi, anti), etc. This definition can be richer than an MV view definition.

In some aspects, if LAG is not specified and the user provides a view definition that is not compatible with the current implementation, then an informative error is gener-ated that will point to a document that details what is allowed/not-allowed. Examples of this include a selection on an MV (selects from materialized tables can be allowed, but not classic MVs). Similar to existing MVs, creation requires CREATE MATERIALIZED TABLE privilege on the schema and SELECT privileges on the base tables and sources.

The following configurations may be used with the ALTER command. The command can be configured as ALTER MATERIALIZED TABLE <name> {SUSPEND | RESUME}. This command allows the user to stop the MT from updating itself via its refresh strategy. A MT can remain suspended until a RESUME is executed.

In some aspects, command ALTER MATERIALIZED TABLE <name> set LAG=<duration> can be used to change the lag of the materialized table. The next scheduled execu-tion of the refresh can reflect the updated lag.

In some aspects, the command ALTER MATERIALIZED TABLE <name> REFRESH [AT (<at_spec>)] can be used to initiate an immediate refresh of the MT. This command may be used with data engineering use cases that may require more direct control over refreshes. For example, it may be common for imperative data pipelines to spend a significant amount of time in an inconsistent state, with new data only partially loaded. Authors of such pipelines would not want a refresh to occur during these inconsistent periods, and they may disable automatic refresh (LAG='infinity') and invoke REFRESH when they know the database is in a consistent state.

In some aspects, the optional AT clause can be used to allow users to control the transactional time from which the MT's source data is read. Using this, they can ensure that multiple manually-orchestrated MTs are aligned correctly, even during backfills.

In some aspects, commands ALTER MATERIALIZED TABLE <name> set REFRESH_MODE= {INCREMENTAL | FULL | AUTO} and ALTER MATE-RIALIZED TABLE <name> unset REFRESH_MODE can be used to change the refresh mode on the MT. The change can be reflected in the next reprocessing of the MT. Unset sets the refresh mode back to the system default. The INCREMENTAL value may be used to maintain the MT by processing changes to the source(s) incrementally. The FULL value may be used to perform a full refresh of the MT (i.e., an entire re-computation). The AUTO value indicates that the network-based database system can determine whether to perform an incremental or full refresh, any may alternate between the two depending on upstream changes and the view definition.

In some aspects, the DROP MATERIALIZED TABLE <name> command can be configured.

In some aspects, SHOW MATERIALIZED TABLES [LIKE '<pattern>'][IN {ACCOUNT | DATABASE [<db_name>]| [SCHEMA] [<schema_name>]}] command can be configured. The existing syntax can be kept, but the follow-ing columns can be added to the existing output:

(a) lag: the user-defined lag duration specified during creation. This configuration can be static, unlike the existing columns.

(b) source_names: a column that has the fully qualified names of the sources used in the MT as a list, ex. ["db". "schema". "table"]. For a longer-term, source_databa-se_name, source_schema_name, and source_table_name can be deprecated in favor of this new column as these will be null for MTs.

In some aspects, the following variants of the EXPLAIN command may be used in connection with the disclosed MT-related functionalities (e.g., to obtain details of an operation on an MT):

(a) EXPLAIN CREATE MATERIALIZED TABLE <mv> LAG=<duration> AS <query> can be used to show the refresh plan before creating an MT.

(b) EXPLAIN ALTER MATERIALIZED TABLE <mv> REFRESH [AT (<at_spec>)] can be used to show the refresh plan for an extant MT.

(c) EXPLAIN SELECT <select> FROM <mv> can be used to show the version and plan used to resolve the MT.

In some aspects, a stream on an MT can be created, similarly to a stream on a view (which is discussed in connection with FIG. 8-FIG. 12).

Figure 4:
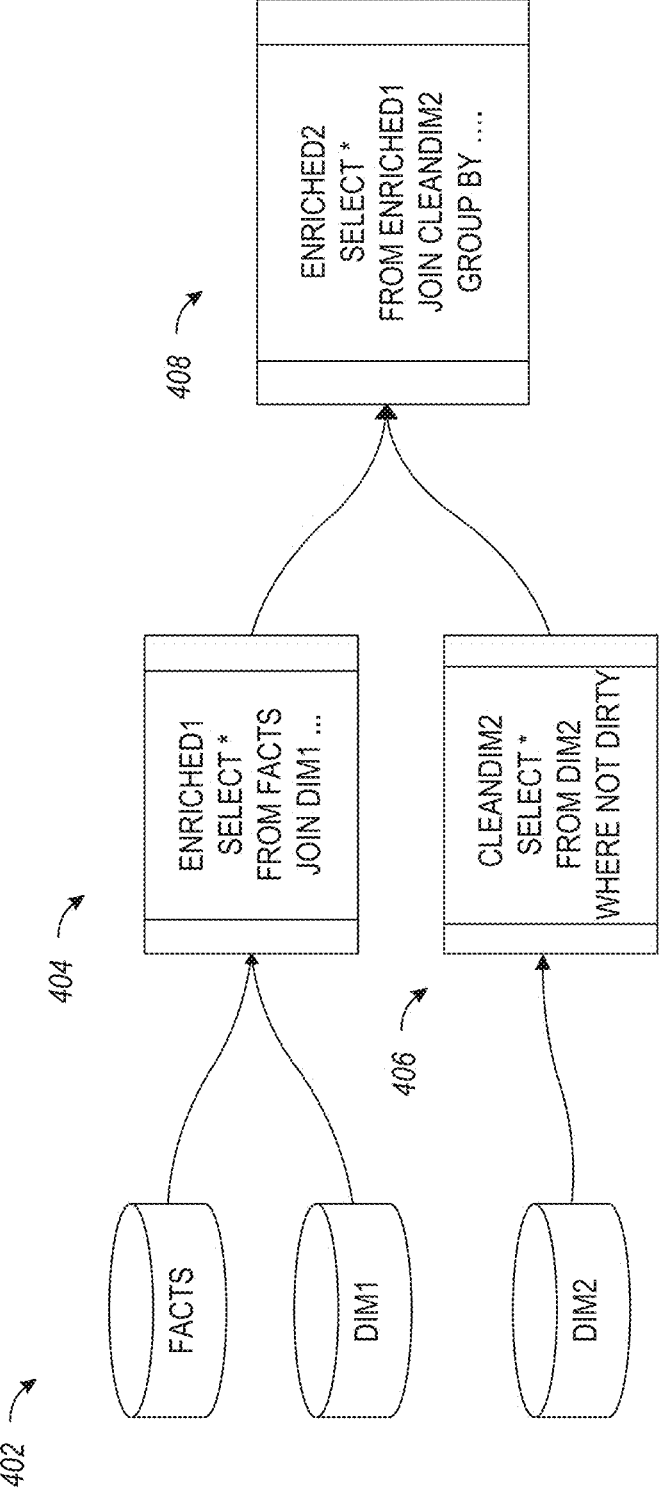
FIG. 4 is a diagram illustrating an example data enrich-ment pipeline using materialized tables (MTs), in accor-dance with some embodiments of the present disclosure.

FIG. 4 is diagram 400 illustrating an example data enrich-ment pipeline using MTs, in accordance with some embodi-ments of the present disclosure.

In some aspects, MT definitions are rendered into a dependency graph, where each node in the graph is an MT query, edges indicate that one MT depends on the results of another, leaf nodes are MTs on base tables, and DDLs (e.g., DDL commands) can be used to log graph changes to a metadata database (e.g., metadata database 112), and an in-memory representation of the graph can be rendered.

Referring to FIG. 4, MT Enriched1 404 is created using a subset of base tables 402, namely, base tables Facts and Dim1. MT CleanDim2 406 is created using base table Dim2 of base tables 402. MT Enriched2 408 is created from MTs Enriched1 and CleanDim2. In this regard, the following processing sequence can be used: (a) an MT is created using other MTs; (b) the MTs (e.g., the MTs 404-408 in FIG. 4) form an acyclic dependency graph (e.g., a directed acyclic graph or DAG); a query in the final MT (e.g., MT Enriched2 408) is parsed to obtain two or more dependent MTs (e.g., MTs Enriched1 404 and CleanDim2 406); and MT refreshes can be scheduled based on the configurations of each MT.

In some aspects, MT refreshes can be scheduled at aligned time instances (or ticks) for consistency. In some aspects, MTs can be joined at consistent times without fine-grained refreshes. A user can provide a lag duration (or lag) target, and refreshes can be scheduled to meet that target. For example, a set of canonical refresh times (e.g., ticks) is selected, which align refreshes at different frequencies. In some aspects, the ticks can be determined based on the following equation: ticks={UnixEpoch+48 seconds*$2^{f*n}$}, where f is the frequency level and n is the refresh instance. In some aspects, refreshes can be scheduled at the nearest tick that meets the user's lag target. Common examples of lag targets and tick periods are provided in Table 1 below:

TABLE 1

| Target Lag | 1 min | 5 min | 15 min | 1 hr | 25 hr |
|---|---|---|---|---|---|
| Tick Period | 48 sec | 3.2 min | 12.8 min | 51 min | 13.6 hr |

Using the above techniques can yield alignment at two scopes: account-wide (MTs can be joined with snapshot isolation) and deployment-wide (MTs can be joined with read-committed isolation).

Figure 5:
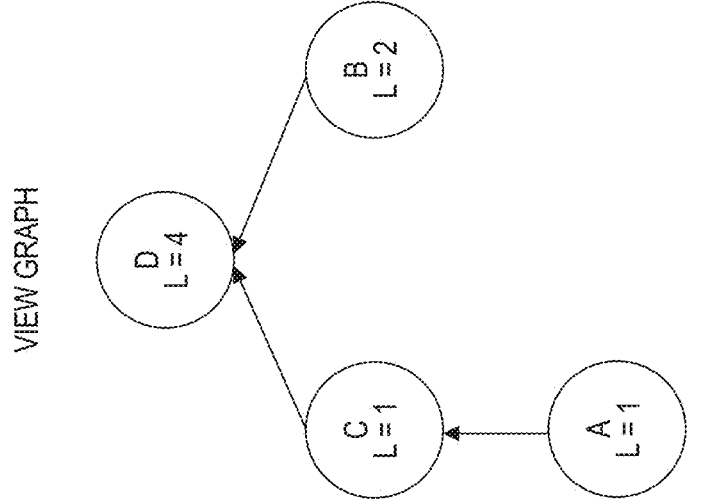
FIG. 5 is a diagram of a view graph of MTs associated with different lag targets, in accordance with some embodi-ments of the present disclosure.

FIG. 5 is a diagram of a view graph 500 of MTs associated with different lag targets, in accordance with some embodiments of the present disclosure. Referring to FIG. 5, graph 500 is associated with a dependency relationship between MTs with different lag durations (indicated as L). For example, MT A (with lag duration L=1) feeds to MT C (with L=1). MT D (with L=4) uses data from MT C (L=1) and MT B (L=2).

Figure 6:
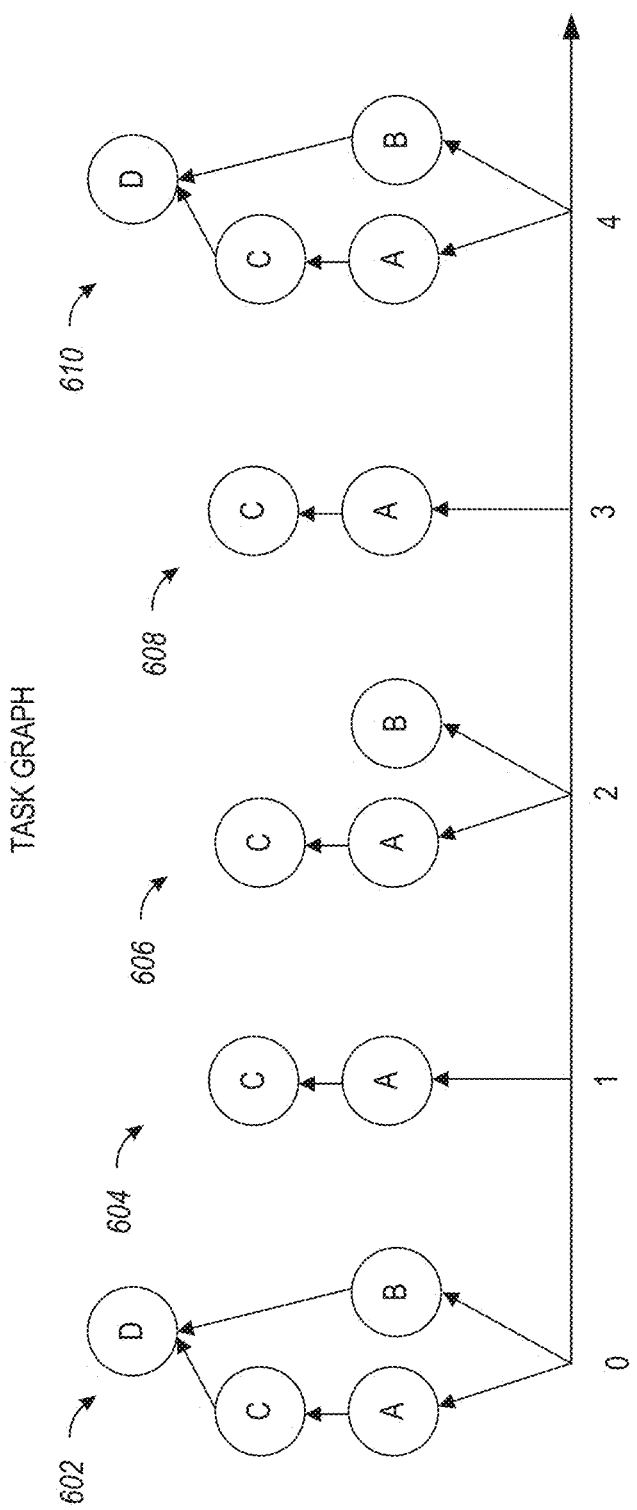
FIG. 6 is a diagram of a task graph of MTs associated with scheduled refreshes at different times according to indi-vidual lag targets, in accordance with some embodiments of the present disclosure.

FIG. 6 is a diagram of a task graph 600 of MTs associated with scheduled refreshes at different times according to individual lag targets, in accordance with some embodiments of the present disclosure. Referring to FIG. 6, graph 600 shows scheduled refreshes of MT groups 602, 604, 606, 608, and 610 at corresponding ticks 0, 1, 2, 3, and 4. More specifically, graph 600 shows scheduled refreshes of the MTs of FIG. 5 based on their lag durations. At time instances 0 and 4 (or ticks 0 and 4), all MTs (A, B, C, and D) are refreshed. At ticks 1 and 3, MTs A and C are refreshed, and at tick 2, MTs A-C are refreshed.

As illustrated in FIG. 6, MTs can be refreshed with different refresh cadences based on the corresponding MT lag durations. In some aspects, the refresh cadences can be configured so that when the MTs are refreshed, the MTs always produce results that their corresponding queries would have produced at some point in time.

In some aspects, a refresh can be configured to execute a maintenance plan that updates the MT's physical table. In some aspects, at each tick, a rooted prefix of the DAG (e.g., the MT dependency graph) can be refreshed. A consistent snapshot of the DAG can be maintained in memory, and a compute service task can be scheduled for each connected component. The connected component task can enter a scheduling loop, which finds nodes with satisfied dependencies and starts a refresh job. In some aspects, a refresh job has a maintenance plan, which can take one of the following forms: (1) a full refresh (truncate the MT table and insert the result of running the MT definition at the tick time); and (2) incremental refresh (compute the changes in the MT since the last refresh tick and merge them into the MT table).

In some aspects, the refresh job creates table versions at the tick time. New MT table versions can be configured with a new property containing the base tables' version IDs. Retries can skip re-computation if the version has already been computed. Additionally, queries can resolve the correct version by specifying an entity version AT (MT_BASE_TIME=><ts>).

The following maintenance plan configurations can be used with the disclosed MT-related functions. The disclosed configurations can be used for the maintenance of MTs via full refreshes and incremental updates. The disclosed design configuration can be used to ensure that MT updates preserve the MT history, which can be essential for time-travel queries to produce consistent results and for computing the updates of downstream views.

In some aspects, MTs can be maintained in the following two ways:

(a) Incremental Update. For an update tick, the set of delta changes (delta set) since the last update is computed and merged into the MT. This technique can use the following configurations: (1) all operations of the MT definition are supported for incremental maintenance; and (2) all base relations provide access to their history and can provide their delta sets.

(b) Full Refresh. For each update tick, the view definition is recomputed and the MT is fully replaced. This technique can be used if the MT definition includes operations that are not yet supported for incremental updates, or if it is not possible (or feasible) to retrieve the delta set of a based relation.

In some aspects, incremental updates and full refreshes can be dynamically switched from one to the other (e.g., based on a detected data processing latency characteristic or other configuration settings).

In some embodiments, all rows in an MT can be uniquely identifiable by a ROW_ID metadata attribute. The ROW_ID attribute can be used to match changes from the delta set with the rows in the MT or compute delta sets from an MT that is fully refreshed (e.g., depending on the size of the MT, this can be beneficial because it allows for incremental maintenance of downstream views). Hence, each MT can have a ROW_ID metadata column (which corresponds to the metadata columns of tables with enabled change tracking).

Example requirements for the ROW_ID include incremental and at-once computation of the ROW_ID that may yield the same value and collisions of ROW_IDs result in data corruption. In some aspects, special mechanisms may be used if base relations are referenced multiple times (self-join, self-union-all, . . . ). Generation can be insensitive to plan changes (join order, input order, . . . ). In some aspects, runtime validation ROW_IDs can be expensive for production, but a debug mode can be added for tests (e.g., full column comparisons for DELETE and UPDATE changes and uniqueness check for INSERT changes can be performed). In some aspects, streams on views can be used to address the ROW_ID requirements.

In some aspects, the following configurations may be used for incremental update maintenance of MTs. Given a delta set (e.g., a set of changes applied to an MT such as an Insert, a Delete, or an Update) for an MT, it can be applied to the MT in two ways:

(a) Single MERGE command. All changes (e.g., encompassed by the delta set) are applied with a single MERGE DML. Updates are processed as upserts (or merges) on the ROW_ID merge key. The following pseudo-code in Table 2 can be used for performing the MERGE command.

TABLE 2

```
MERGE INTO mt m
USING (
  SELECT *, metadata$action, metadata$isupdate, metadata$row_id
  FROM delta_set
  WHERE
    -- upsert on ROW_ID doesn't require the DELETE of an UPDATE change
    NOT (metadata$action = 'DELETE' AND metadata$isupdate = TRUE)) AS d
ON m.metadata$row_id = d.metadata$row_id
WHEN MATCHED AND metadata$action = 'DELETE'
  THEN DELETE
WHEN MATCHED AND metadata$action = 'INSERT' AND metadata$isupdate
= TRUE
  THEN UPDATE SET m.* = d.*, m.metadata$row_id = d.metadata$row_id
WHEN NOT MATCHED AND metadata$action = 'INSERT' AND
metadata$isupdate = FALSE
  THEN INSERT (*, m.metadata$row_id) VALUES (d.*, d.metadata$row_id);
```

(b) A MERGE command followed by an INSERT command. The DELETE and UPDATE changes of the delta set can be applied with a MERGE DML command. The INSERT changes can be applied later with a separate INSERT DML command. The following pseudo-code in Table 3 can be used for performing the MERGE command followed by the INSERT command.

TABLE 3

```
MERGE INTO mt m
USING (
  SELECT *, metadata$action, metadata$isupdate, metadata$row_id
  FROM delta_set
  WHERE
    -- upsert on ROW_ID doesn't require the DELETE of an UPDATE change
  NOT (metadata$action = 'DELETE' AND metadata$isupdate = TRUE)
    -- INSERT changes are applied with subsequent INSERT DML
  AND NOT (metadata$action = 'INSERT' AND metadata$isupdate = FALSE)
AS d
ON m.metadata$row_id = d.metadata$row_id
WHEN MATCHED AND metadata$action = 'DELETE'
  THEN DELETE
WHEN MATCHED AND metadata$action = 'INSERT' AND metadata$isupdate
= TRUE
  THEN UPDATE SET m.* = d.*, m.metadata$row_id = d.metadata$row_id;
INSERT INTO mt(*)
SELECT d.*
FROM delta_set d
WHERE metadata$action = 'INSERT' AND metadata$isupdate = FALSE;
```

The above processing can reduce the amount of data to match during a MERGE. The delta set may be persisted to consume from both DMLs.

In some aspects, using ROW_ID as a merge key may create a performance issue (e.g., artificial join keys have a bad locality and can result in inferior performance; an additional merge key may need to be added).

In some aspects, the MERGE as configured by both approaches may require a perfect delta set without duplicate keys. However, deduplicating changes to obtain a perfect delta set can be costly. Streams can produce perfect delta sets and no deduplication is needed. Bitsets may reduce the cost to derive delta sets with duplicates significantly such that they outperform perfect delta sets. In some aspects, the MERGE can be configured to deduplicate merge keys. In some aspects, the delta streams can be used to address redundancies (e.g., an insert and delete with the same row ID and the same values for all columns). More specifically, delta streams can filter out redundancies, and bitsets can reduce the number of such redundancies substantially.

In some aspects, the following configurations may be used for full refresh maintenance. A full refresh set can be computed by evaluating the view definition (enriched by the computation of the ROW_ID attribute) on a consistent version of all base relations. The refresh set can be applied in two ways:

(1) Full replacement: deletes all rows of the MT and inserts all rows of the refresh set. Commands listed in Table 4 can be used for a full replacement.

TABLE 4

```
DELETE FROM mt;
INSERT INTO mt(*)
SELECT f.*
FROM full_set f;
```

In some aspects, the ROW_ID ensures that a delta set can be computed from the fully refreshed MT. Depending on the MT size, this processing may be expensive because a full scan and processing of both versions of the MT may be needed.

(2) Merging Changes: compute the differences between both MT versions and evolve the MT into the new version. First, delete all rows that are no longer in the new version, then update all rows that were modified and insert all new rows with a MERGE DML. Commands listed in Table 5 can be used for merging changes.

US 12,650,982 B2

21

TABLE 5

```
DELETE FROM mt m
WHERE m.metadata$row_id NOT IN (
SELECT metadata$row_id FROM full_set);
MERGE INTO mt m
USING full_set f
ON m.metadata$row_id = f.metadata$row_id
-- update record
WHEN MATCHED AND m.* <> f.*
    THEN UPDATE SET m.* = d.*, m.metadata$row_id =
d.metadata$row_id;
-- insert record
WHEN NOT MATCHED
    THEN INSERT (*, m.metadata$row_id) VALUES
(d.*, d.metadata$row_id);
```

In some aspects, merging changes can be more expensive than fully replacing the MT. However, it may be cheaper to extract a delta set from an MT that was updated by merge because fewer records might have been changed. The initial approach to applying full refresh sets can be a full replacement.

In some aspects, delta sets can be persisted as temporary tables. This allows for merging the delta set in multiple steps (e.g., MERGE for UPDATE/DELETE and INSERT), computing and persisting the delta set before the previous delta has been applied on the MT (e.g., defer merging until MT is on the right version), and scan delta set from the persisted table instead of computing it from MT's history when updating downstream MTs.

After the delta set is merged to its MT and all downstream MTs are updated, the temporary table can be deleted.

Figure 7:
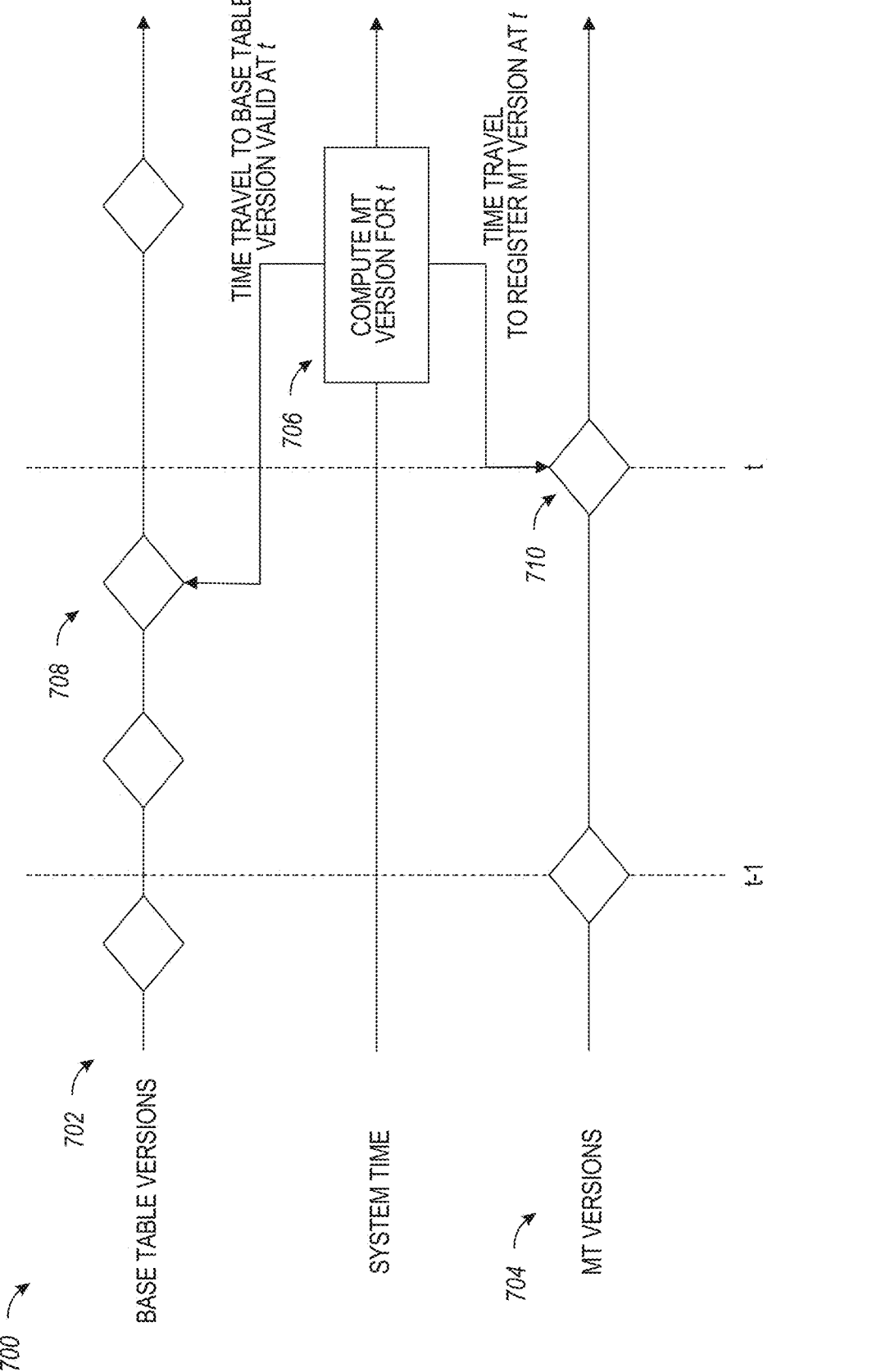
FIG. 7 is a diagram illustrating the use of data manipu-lation language (DML) commands and time travel queries to compute an updated set of an MT with respect to specific versions of its base relations, in accordance with some embodiments of the present disclosure.

FIG. 7 is diagram 700 illustrating the use of data manipulation language (DML) commands and time travel queries to compute an updated set of an MT with respect to specific versions of its base relations, in accordance with some embodiments of the present disclosure.

In some aspects, the table versions 704 of MTs may be aligned with the base table versions 702 of their corresponding base tables. Using time travel queries (e.g., query 706), the update set of a MT 710 may be computed concerning specific versions (e.g., base table 708) of its base relations (e.g., as illustrated in FIG. 7). The new MT version that results from merging the update set in alignment may be registered with the versions of its base relations. Hence, capabilities for the DMLs that update MTs may also be configured. The following describes how to register table versions for MTs and how to look up their versions when they are queried for a specific time.

In some aspects, DML commands that create table versions at a specific time in an MT's base tables' time domain can be configured. The base version time of a new version can be assumed to be after all preceding MT table version base times. Additionally, reads can resolve table versions in this time domain.

In some aspects, streams on MTs can be configured similarly to streams on views (e.g., as discussed in connection with FIGS. 8-12).

Figure 8:
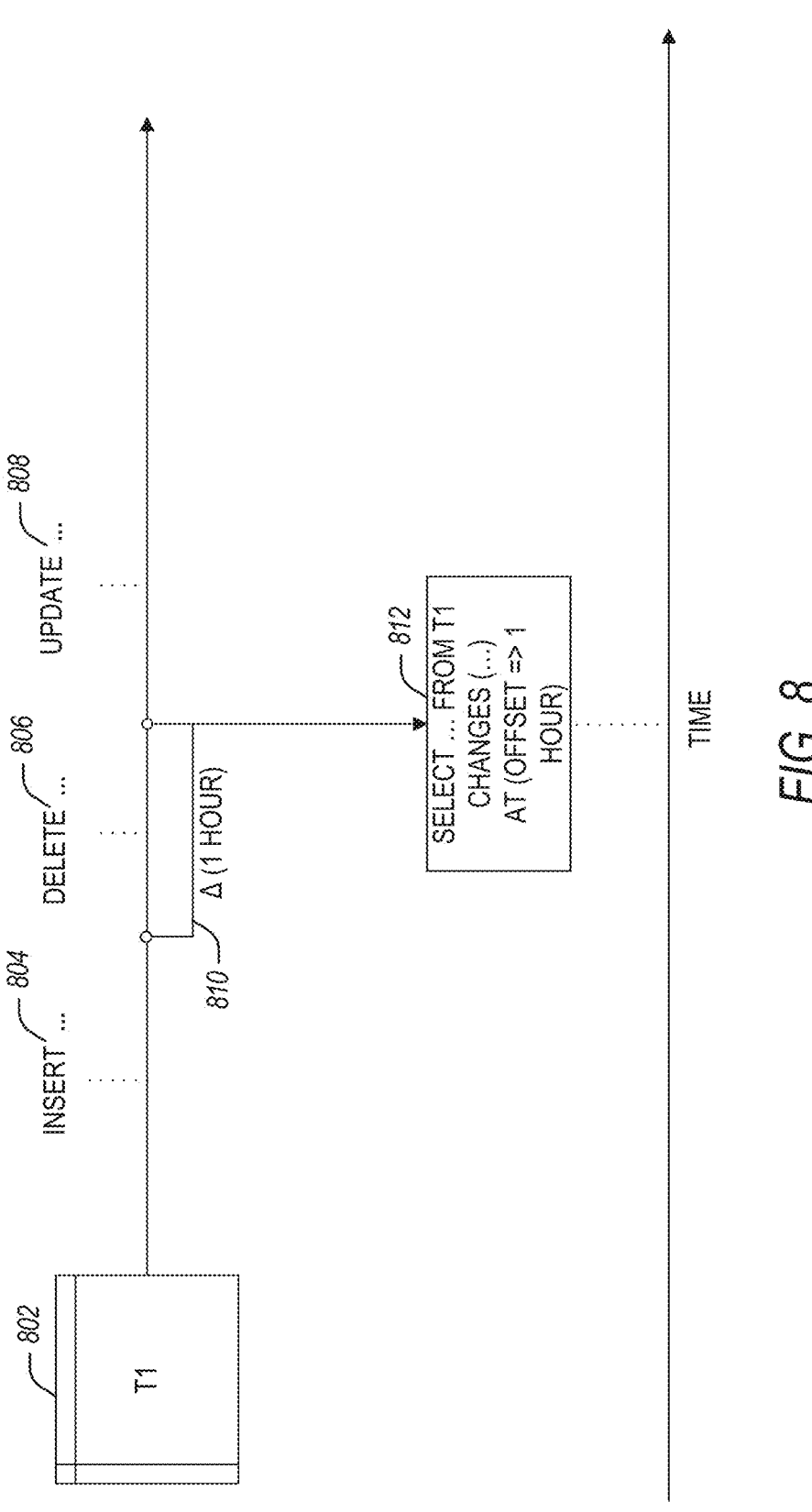
FIG. 8 is a diagram of using a CHANGES clause in connection with query processing, in accordance with some embodiments of the present disclosure.

FIG. 8 is diagram 800 of using a CHANGES clause in connection with query processing, in accordance with some embodiments of the present disclosure. Referring to FIG. 8, queries or data processing commands Insert 804, Delete 806, and Update 808 are applied to source table 802. As illustrated in FIG. 8, the SELECT statement 812 may be used for returning the changes that occurred to the source table 802 during period 810 (e.g., one hour).

As used herein, the term "stream" refers to a table and a timestamp. In some aspects, a stream may be used to iterate over changes to a table. When a stream is read inside a Data Manipulation Language (DML) statement, its timestamp may be transactionally advanced to the greater timestamp of its time interval (docs).

Figure 9:
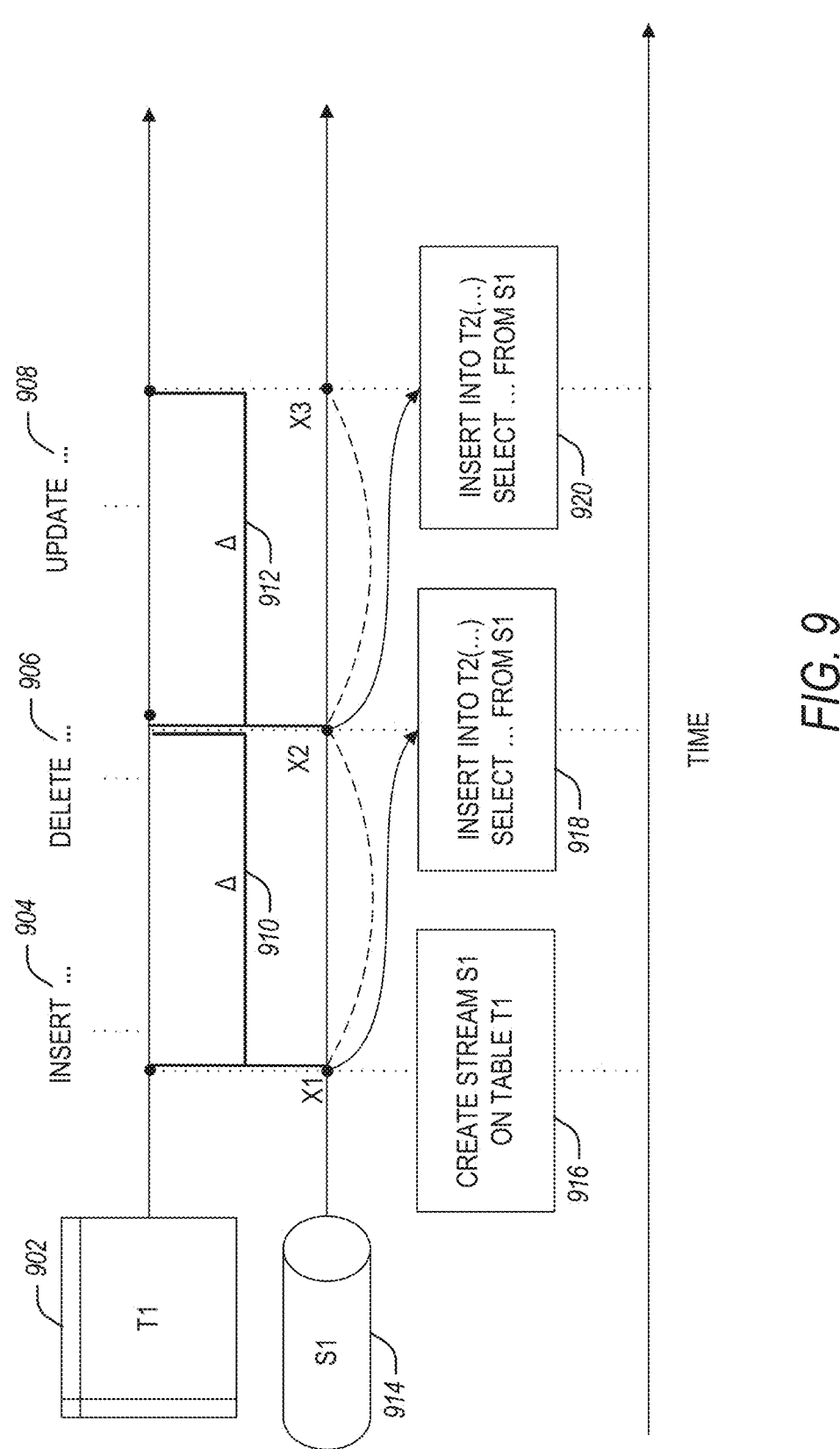
FIG. 9 is a diagram of a stream object configuration for a table, in accordance with some embodiments of the present disclosure.

FIG. 9 is diagram 900 of a stream object configuration for a table, in accordance with some embodiments of the present disclosure. Referring to FIG. 9, queries or data processing commands Insert 904, Delete 906, and Update 908 are applied to source table 902. As illustrated in FIG. 9, a stream 914 is generated on source table T1 902 at times X1, X2 (after a time interval of 910 from X1), and X3 (after a time interval of 912 from X2). Additionally, at operation 916, stream S1 is created on table T1. At operation 918, stream S1 produces the changes in T1 from time X1 to time X2, which are inserted into table T2. At operation 920, stream S1 produces the changes in T1 from time X2 to time X3, which are inserted into table T2.

As used herein, the term "access control" indicates that customers can control who can access database objects within their organization (docs).

As used herein, the term "data sharing" indicates customers can grant access to database objects to other organizations (docs).

In some aspects, any query with a CHANGES clause or a stream may be referred to as a change query. A change query on a view may be defined similarly.

In some embodiments, the MT manager 128 is configured to provide changes to views (e.g., a stream on views) so that the changes may be further processed and acted on. More specifically, the MT manager 128 may be configured to provide or process streams on views in connection with the following three use cases: shared views, complex views, and view evolution. In some aspects, more than one use case may apply at a given time.

Shared (secure) views may be used to provide (e.g., a user or organization) limited access to sensitive data. The consumer of the data often wishes to observe changes to the data being shared with them. Some considerations implied by this use case include giving the consumer visibility into the shared view's retention period and how to enforce secure view limitations on change queries.

Figure 10:
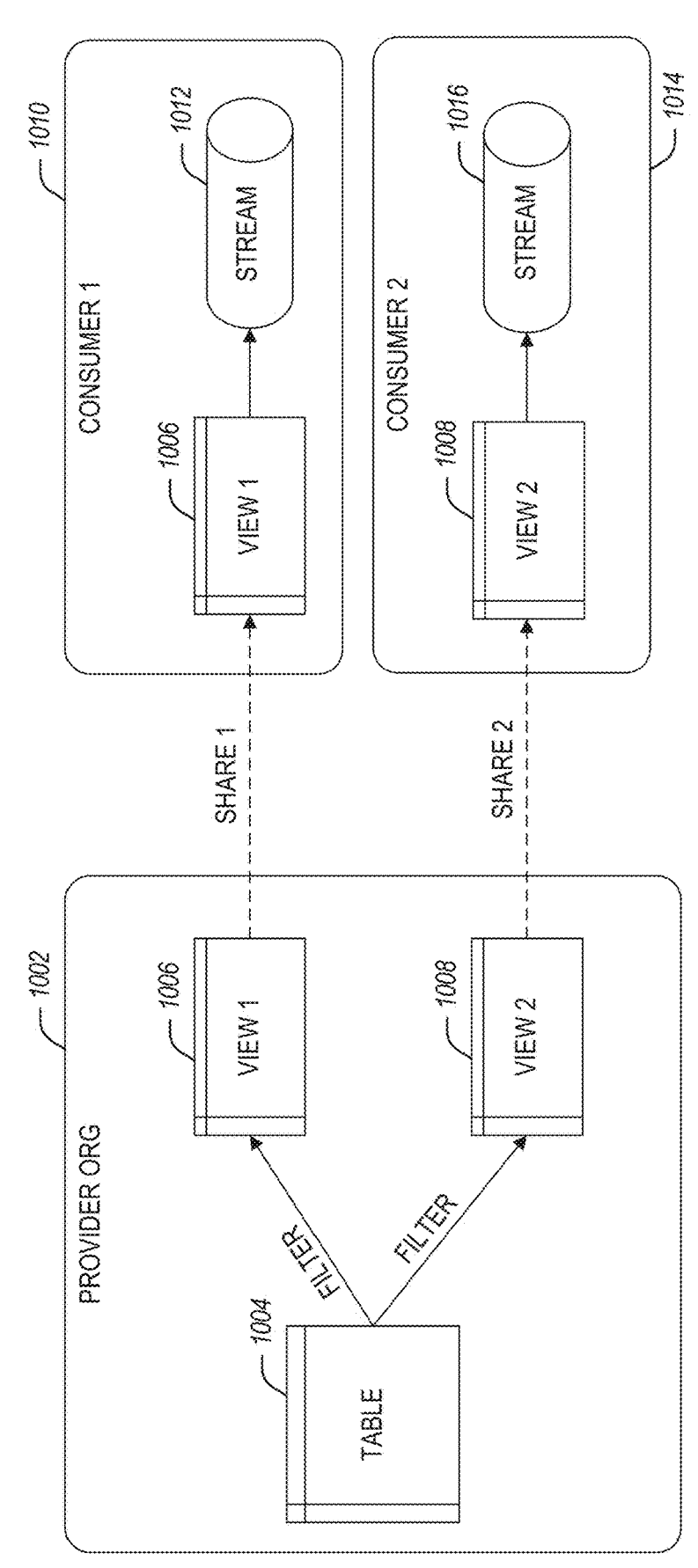
FIG. 10 is a diagram of shared views, in accordance with some embodiments of the present disclosure.

FIG. 10 is a diagram 1000 of shared views, in accordance with some embodiments of the present disclosure. Referring to FIG. 10, a data provider 1002 manages a source table 1004. The data provider 1002 applies different filters to source table 1004 to generate views 1006 and 1008. View 1006 is shared with consumer 1010, and view 1008 is shared with consumer 1014. In some embodiments, the MT manager 128 is used for configuring streams 1012 and 1016 on corresponding views 1006 and 1008 for consumption by consumers 1010 and 1014.

The definition of a view can be quite complex but observing the changes to such a view may be useful independently of its complexity. Manually constructing a query to compute those changes may be achieved, but can be toilsome, error-prone, and suffer from performance issues. In some aspects, a change query on a view may automatically rewrite the view query, relieving users of this burden. In some aspects, simple views containing only row-wise operators (e.g., select, project, union all) may be used. In some aspects, complex views that join fact tables with (potentially several) slowly-changing-dimension (DIM) tables may also be used. Other kinds of operators like aggregates, windowing functions, and recursion may also be used in connection with complex views.

Figure 11:
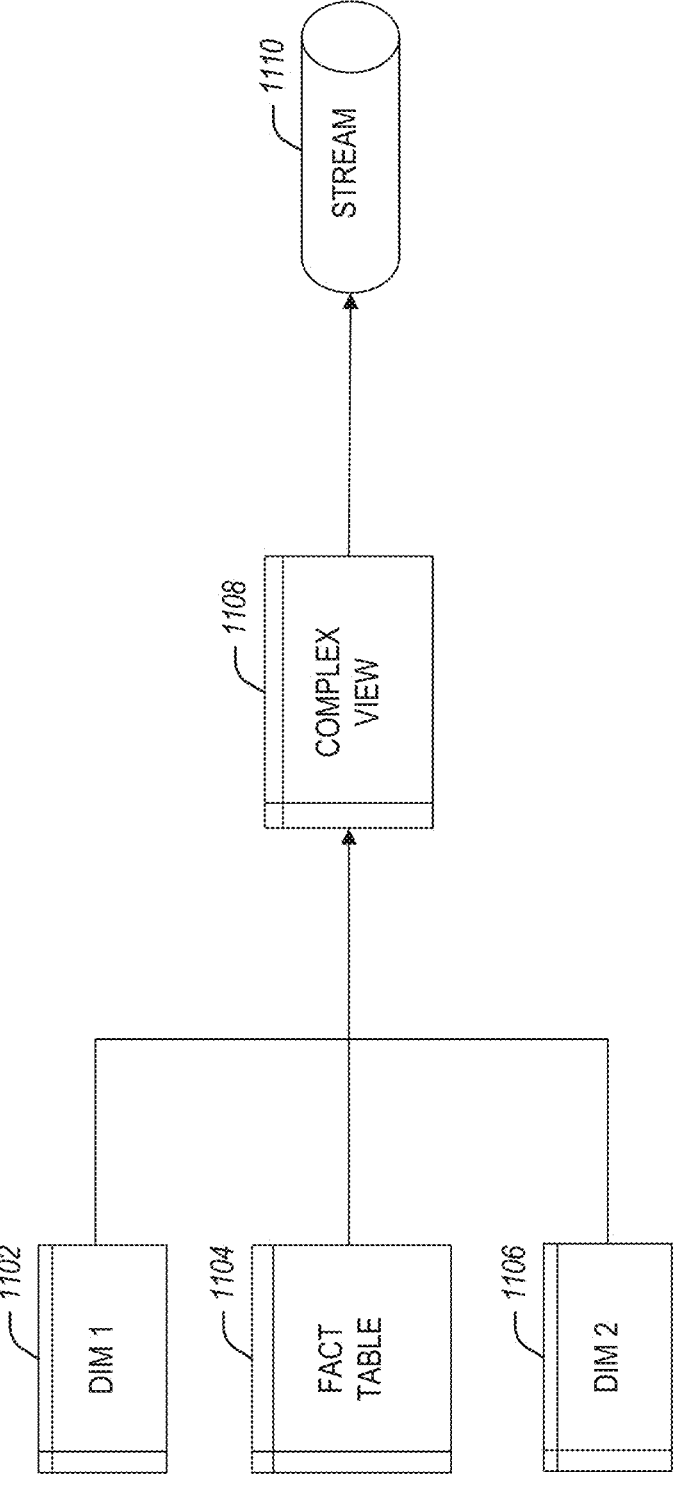
FIG. 11 is a diagram of a stream object based on a complex view, in accordance with some embodiments of the present disclosure.

FIG. 11 is diagram 1100 of a stream object based on a complex view, in accordance with some embodiments of the present disclosure. Referring to FIG. 11, a complex view 1108 may be generated based on source tables 1102, 1104, and 1106. In some embodiments, the MT manager 128 configures a stream 1110 based on the complex view 1108 of source tables 1102, 1104, and 1106.

In some aspects, views may be used to create an abstraction boundary, where the underlying tables can be modified without consumers being aware. For example, a view over a table undergoing a backward-incompatible schema change may be replaced by a new query that presents the same data in a different query, causing a view evolution. In some aspects, change queries may work across view redefinition, allowing change observation to the view uninterrupted by modifications to its definition. Considerations for this use case may include schema compatibility and performance. Some view redefinitions may use full joins to resolve, and others, such as workflows involving table clones, could be resolved more efficiently.

Figure 12:
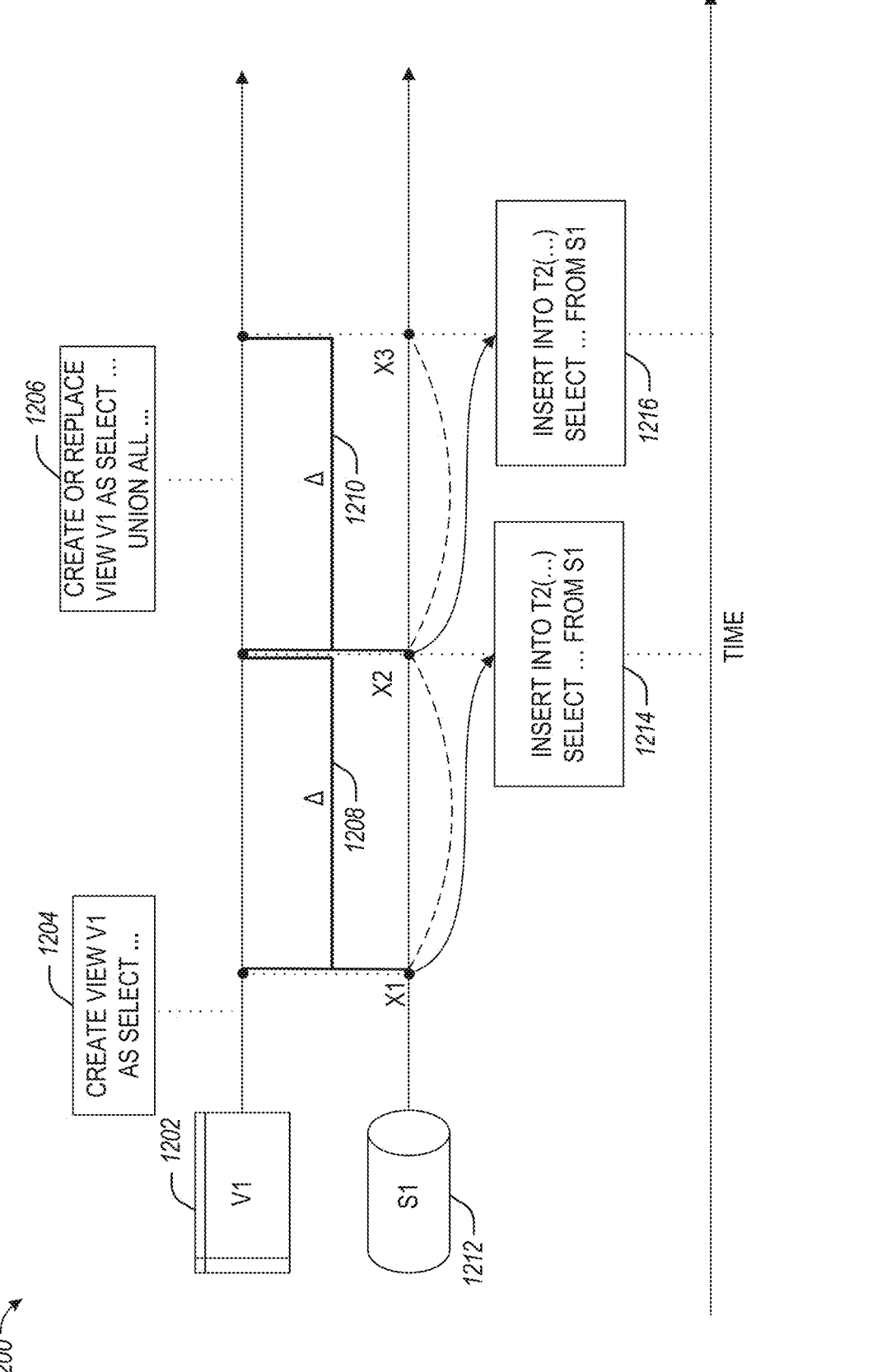
FIG. 12 is a diagram of a view evolution, in accordance with some embodiments of the present disclosure.

FIG. 12 is diagram 1200 of a view evolution, in accordance with some embodiments of the present disclosure. Referring to FIG. 12, at operation 1204, view V1 1202 is created based on a Select operation. Stream S1 1212 of view V1 1202 is generated at times X1, X2 (after a time interval of 1208 from X1), and X3 (after a time interval of 1210 from X2). Additionally, at operation 1214, a stream entry from stream S1 at time X2 is inserted into table T2. Before time X3, view V1 1202 evolves at operation 1206, when a union all operation is used. At operation 1216, a stream entry from stream S1 (based on the evolved view V1 at time X3) is inserted into table T2.

In some embodiments, to provide or process streams on views in connection with the above-listed use cases, the MT manager 128 may be configured with the following functionalities: intuitive semantics, unsurprising security, linear cost scaling, and easy operability.

In some aspects associated with intuitive semantics, change queries on views may work intuitively and consistently. The essence of a change query is to take a time-varying object and a time interval, then return a set of changes that explain the differences in the object over the interval. This definition applies naturally to views, but there are some additional configurations addressed below.

As not all operations may be supported by the MT manager 128, property on views may be configured which explicitly allows change queries on it: CHANGE_TRACKING=true. When a view is created with this property enabled, a validation is performed that it only contains supported operators and the base tables have change tracking enabled. When a change query is issued on a view, it may succeed if the view has change tracking enabled.

In some aspects, a standing change query (e.g., a stream) may exhibit reference semantics. That is, when a user specifies a view in a change query, such specification may be interpreted as referring to the view itself, not what the view is currently defined as. Adopting value semantics would likely result in surprising behavior, especially around access management.

Adopting reference semantics is associated with the ways a view can be modified. The following techniques may be used for view modifications:

(a) "ALTER VIEW . . . RENAME TO . . . " When a view is renamed, objects referencing it may be updated. Complying with this precedent means a stream should break if its view is renamed.

(b) "ALTER VIEW . . . SET SECURE . . . " If a view is made secure, subsequent change queries to it should enforce secure view constraints.

(c) "CREATE OR REPLACE VIEW . . . " If a view is replaced, there are processing choices. Per the View Evolution use case, some users may want the view to keep working as long as the replacement is schema compatible. However, this may add complexity to the implementation.

In some aspects associated with unsurprising security, a consumer of a change query on a view may have the same access they have to the view itself. The following configurations may apply to all views: creating a stream on a view fails if the underlying tables do not have change tracking enabled, and the creator does not have permission to enable it; consumers can see the minimum retention period of the tables referenced by a view (they cannot see which table the retention applies to); and if change tracking was enabled on a table in a view more recently than the beginning of the retention period, consumers can see when it was enabled.

In some aspects, the following configurations may be applied to secure views: consumers cannot see the view's definition; consumers cannot issue a change query before access was granted to the view; optimizations abide by secure view limitations (they do not reorder operators into the expanded view), and the retention period on a table in a secure view is not extended automatically to prevent a consuming stream from going stale.

In some aspects associated with linear cost scaling, a key attribute of change queries on tables is that their cost (both in terms of latency and credits) may be proportional to the result size. Append-only change queries may be introduced to work around cases when this scaling does not hold for delta queries. In some aspects, change queries on views may scale similarly in cost. That is, delta change queries and append-only change queries may scale proportionally to the result size.

In some aspects associated with easy operability, introducing change queries on views may increase the likely distance between the view provider and consumer (the shared views use case may revolve around this). The distance makes collaboration between provider and consumer more difficult. In turn, this means that a smooth operational experience for change queries on views is more important than for traditional change queries. In some aspects, the following operational challenges may be addressed by the MT manager 128: handling view modification and surface errors.

In some aspects associated with the handling of view modifications, if the view provider renames or replaces their view, a stream on it will break. The consumer will then want to take action to repair it. The details of such repairs are use case-specific but it may involve trying to recreate the stream with a new definition and resuming where the broken stream let off. To support this, the MT manager 128 may be configured to support statements of the following form: CREATE OR REPLACE STREAM s . . . AT (STREAM=>s). The stream S is being both queried and replaced.

In some aspects associated with surface errors, a view consumers may try to issue change queries that are invalid for various reasons. The errors may be surfaced clearly to the consumer. Examples of such errors include: the underlying tables may not have change tracking enabled; the change query may be outside of the tables' retention period; the change query may contain unsupported operators; and the view may have been modified, breaking the change query.

View providers may have control over what happens to a view and any objects derived from it. However, they would benefit from visibility into how the view is being used to avoid accidentally breaking consumers. Examples of such notices include when the provider tries to make a breaking modification to a view, warn the provider that consumers will be disrupted; when consumers' change queries fail due to retention or change tracking, send the provider a notification; and support some introspection as well, such as a view provider looking up the number of streams consuming it and their offsets.

A stream object on tables (including external tables) may be configured to let the user retrieve a stream of changesets as the underlying data in the table changes. A stream object is configured to maintain a position in this list of changesets and that is only advanced if it is used in a DML statement. Reading from the stream may return the changeset from the current position up to the current transaction timestamp. As the underlying data changes the size of the changeset will grow until the stream is advanced. In some aspects, the advance may be transactional.

In some embodiments, the MT manager 128 is configured to create and process stream objects on views, in particular for data-sharing scenarios. In some aspects, shared data consumers may be able to get the latest changes from the shared data provider. Given that exposing shared data is done through secure views, a stream may be created on the consumer side on the view from the provider. In some aspects, streams on materialized views may also be configured to allow retrieving changesets as the underlying MV changes.

In some embodiments, providing changesets on a view (e.g., a query) is similar to the incremental materialized view maintenance problem. In the case of MVs as the underlying data source(s) change, the materialized data set may be updated incrementally. In some aspects, this processing may be performed at the micro-partition level to create a query plan which uses the data from the added/deleted partitions and merges it with the MV data to produce the updated data.

In the case of a stream object (or stream) on a view, the changeset returned may be the delta of the data the view would return at the current transactional time compared to the data the view would return at the transactional time of the position of the stream. In some aspects, computing the delta efficiently may be a consideration since there may be no materialized data set that can be leveraged and incrementally updated. In some aspects, a materialized view may be created behind the scenes to mitigate this with the limitations of the queries MVs support today which can make sense, especially for aggregate queries.

In some aspects, the delta for certain classes of queries may be generated efficiently (e.g., if there is only one data source). In that case, the data source of the view can be logically replaced with the delta provided by the stream on the data source. In some embodiments, the MT manager 128 may support projections and filters in the view as well. For example, data processing operators may be allowed where applying the operators on the delta provides the same result as computing the delta on the datasets at the two endpoints. In the initial solution when the stream is created on a view, support for the view is validated, the data source table is located, and change tracking is set up for the table. When the data is requested from the stream, the underlying view in the query plan is expanded, and the data source table is replaced with generating the delta (similar to the processing applied if a stream on that table is configured in the first place). This processing may also be supported for secure views as well since the data source inside is swapped and no outside filters would get pushed in.

In addition to maintaining the position of the start point of the change set, the stream may also implicitly expand the retention period on the underlying table up to two weeks depending on how far in the past of the table version history the stream position points. Such processing may also be performed for non-remote data sources. For shared data sources, the same mechanism may not be used because the table compaction status data on the remote side would need to be updated. In this regard, streams on shared data sources can go stale after a day which is the default retention period for tables. To mitigate this effect, the provider of the shared data can increase the retention period on the table to allow more time for the stream on the provider side to be consumed (and advanced).

Figure 13:
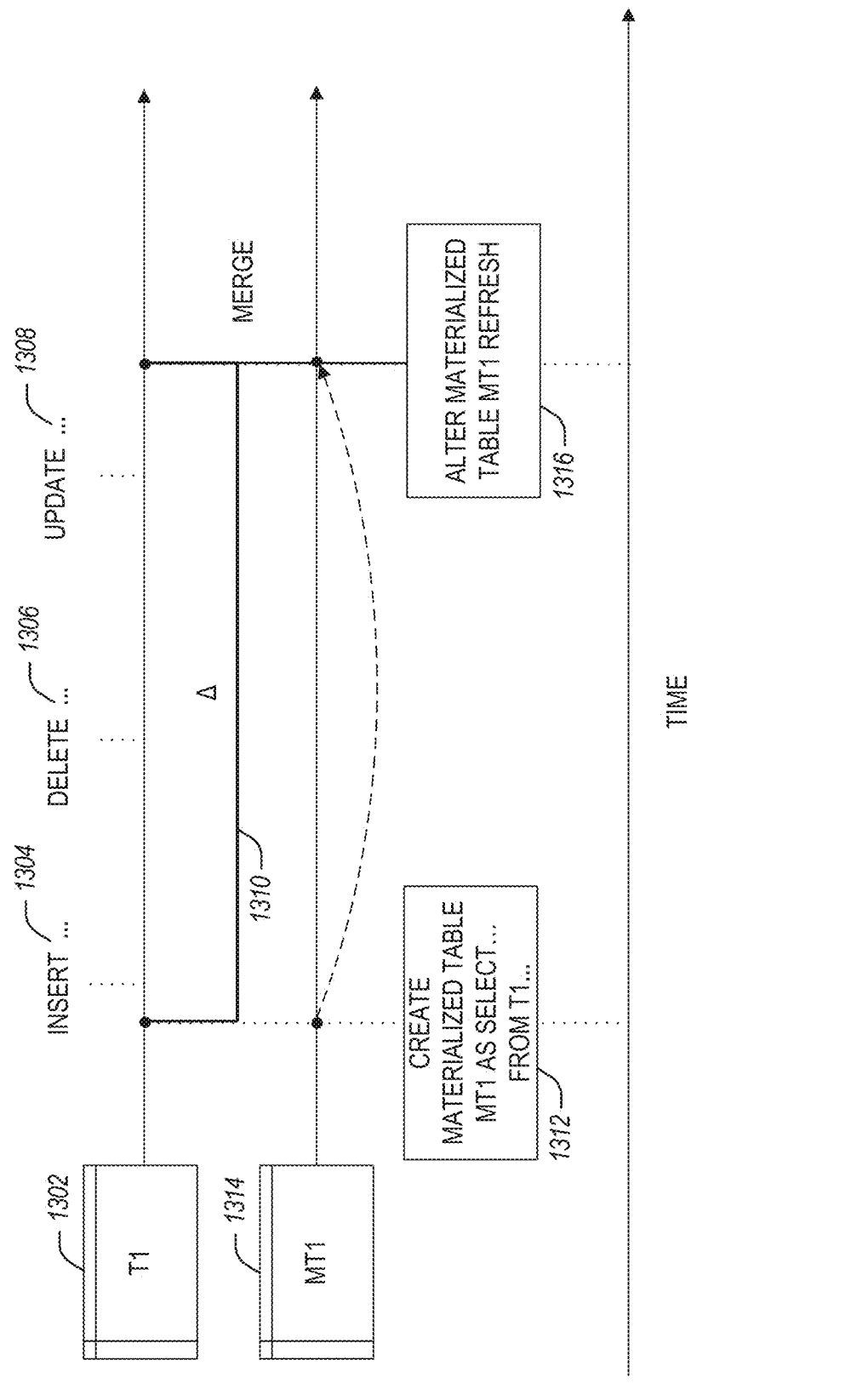
FIG. 13 is a diagram of a materialized table (MT) refresh, in accordance with some embodiments of the present dis-closure.

FIG. 13 is diagram 1300 of a materialized table (MT) refresh, in accordance with some embodiments of the present disclosure. Referring to FIG. 13, at operation 1312, a materialized table MT1 1314 is created as a select from base table T1 1302. A delta set 1310 can be computed for the base table 1302, which can include data changes based on an Insert operation 1304, a Delete operation 1306, and an Update operation 1308 applied to base table 1302. A refresh operation 1316 can be performed on MT1 1314 by merging the delta set 1310 with MT1 1314.

In some aspects, an incremental refresh of MTs can be configured using configurations and techniques discussed herein. An incremental refresh can be a more optimal function in place of computing a state of an MT every time a refresh is needed. During an incremental refresh, data is considered from the last time query results are computed, the difference between the query results and a new value is determined, and the determined change (or difference) is applied on top of the previous result.

The disclosed incremental refresh configurations can be used to handle several interdependent scenarios, which can make it challenging to partition into independent pieces. The scenarios are:

(a) Nested MTs: an MT queries another MT. Changes to one must be incrementally propagated to the other.

(b) Composite MTs: a single MT contains a sufficiently complex query that needs to be split into two or more MTs containing an intermediate state. A simple example of this scenario is COUNT (DISTINCT*).

(c) Query Facades: when querying an MT, the query plan may need to apply additional operations atop the intermediate state to compute the correct result. An example of this is AVG (_), which can be stored as SUM (_) and COUNT ( ) separately, then produced as the quotient.

Figure 14:
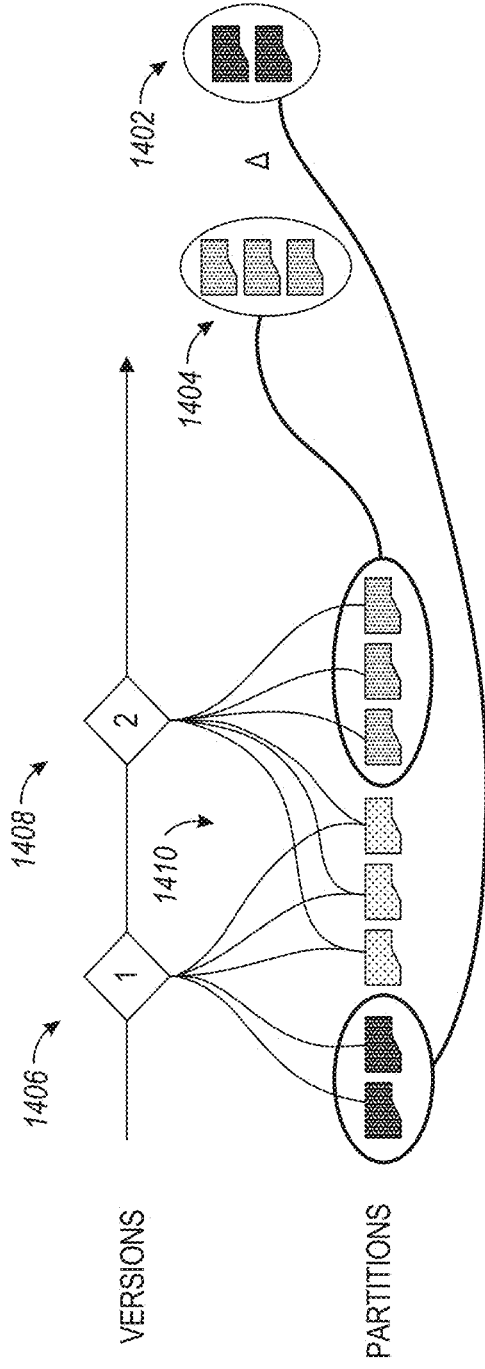
FIG. 14 is a diagram illustrating the determination of changes (or delta ($\Delta$)) to a base table for an MT refresh, in accordance with some embodiments of the present disclo-sure.

FIG. 14 is a diagram 1400 illustrating the determination of changes (or delta (Δ) or delta set) to a base table for an MT refresh, in accordance with some embodiments of the present disclosure. Referring to FIG. 14, a base table can be associated with versions 1406 and 1408 (also referenced as 1 and 2 in FIG. 14). To determine the delta set, the deleted files 1402 are determined, and the new (added) files 1404 are determined. The common files 1410 can be ignored for purposes of delta set determination. The delta set is the symmetric set difference of the rows in the deleted files 1402 and the rows in the added files 1404.

In some aspects, the MT lifecycle can be modeled as the following four phases: creation, scheduling, refresh, and query. Each of these phases is described below.

MT Creation

Figure 15:
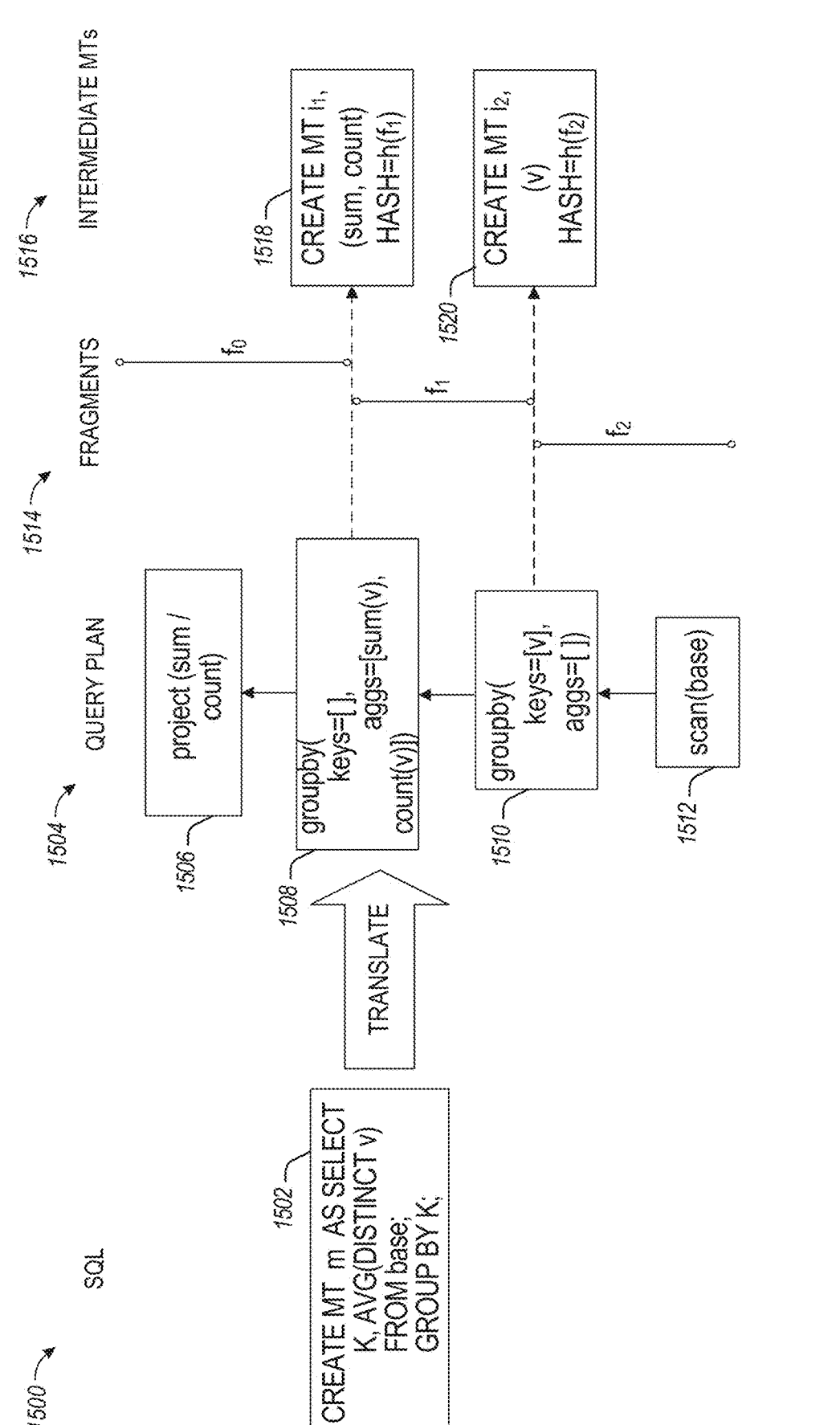
FIG. 15 is a diagram illustrating the creation of an MT and a corresponding query plan associated with stateless fragments and intermediate MTs, in accordance with some embodiments of the present disclosure.

When an MT is created, if the MT can be maintained incrementally, a determination can be made on how to represent its intermediate state. The determination can include splitting the plan into stateless fragments interspersed with hidden MTs which hold the intermediate state. FIG. 15 shows how this process would work for a multi-aggregate query.

FIG. 15 is a diagram 1500 illustrating the creation of an MT and a corresponding query plan associated with stateless fragments and intermediate MTs, in accordance with some embodiments of the present disclosure. Referring to FIG. 15, an MT query 1502 can be broken down into multiple operators to obtain a query plan 1504. For example, MT query 1502 can be broken down into a Scan operation 1512, GroupBy operations 1510 and 1508, and a Project operation 1506.

The query plan can be split into sets of operators, or fragments 1514, connected by hidden (or intermediate) MTs 1516 created to hold the intermediate state using the nested objects framework. The fragmentation process produces repeatable indexes for each fragment (e.g., fragments f0, f1, f2, and f3), which are stored in each intermediate MT (e.g., intermediate MTs 1518 and 1520) along with a hash of the fragment itself.

In some aspects, query plan 1504 can be parsed (e.g., by the MT manager 128) to determine a plurality of data processing operations (e.g., operations 1506-1512) and an intermediate state of the plurality of data processing operations. The plurality of data processing operations can be associated with one or more fragments 1514, where each of the one or more fragments 1514 is indicative of an intermediate state of at least one of the plurality of data processing operations. For example, fragment f2 can be indicative of an intermediate state associated with the transition from operation 1512 to operation 1510. Fragment f1 can be indicative of an intermediate state associated with the transition from operation 1510 to operation 1508. Fragment f0 can be indicative of an intermediate state associated with the transition from operation 1508 to operation 1506. The query plan 1504, the one or more fragments 1514, and the intermediate MTs 1516 can be recorded (or stored) in a storage location (e.g., separately).

In some aspects, the changes to the MT dependency graph can be logged to a slice, which represents top-level and intermediate MTs as nodes in the graph and dependencies as directed edges between them.

FIG. 15 illustrates how intermediate MTs are created. For example, at every GroupBy operation 1510 and 1508, an intermediate MT can be created (e.g., one intermediate MT 1520 can be used for the Distinct operation and one intermediate MT 1518 can be used for the Average (or AVG) operation).

The initial contents of the MT can be seeded using the SHOW_INITIAL_ROWS feature of change rewrites, which add change metadata columns to the plan, but otherwise, simply run the query as-is.

MT Scheduling

Figure 16:
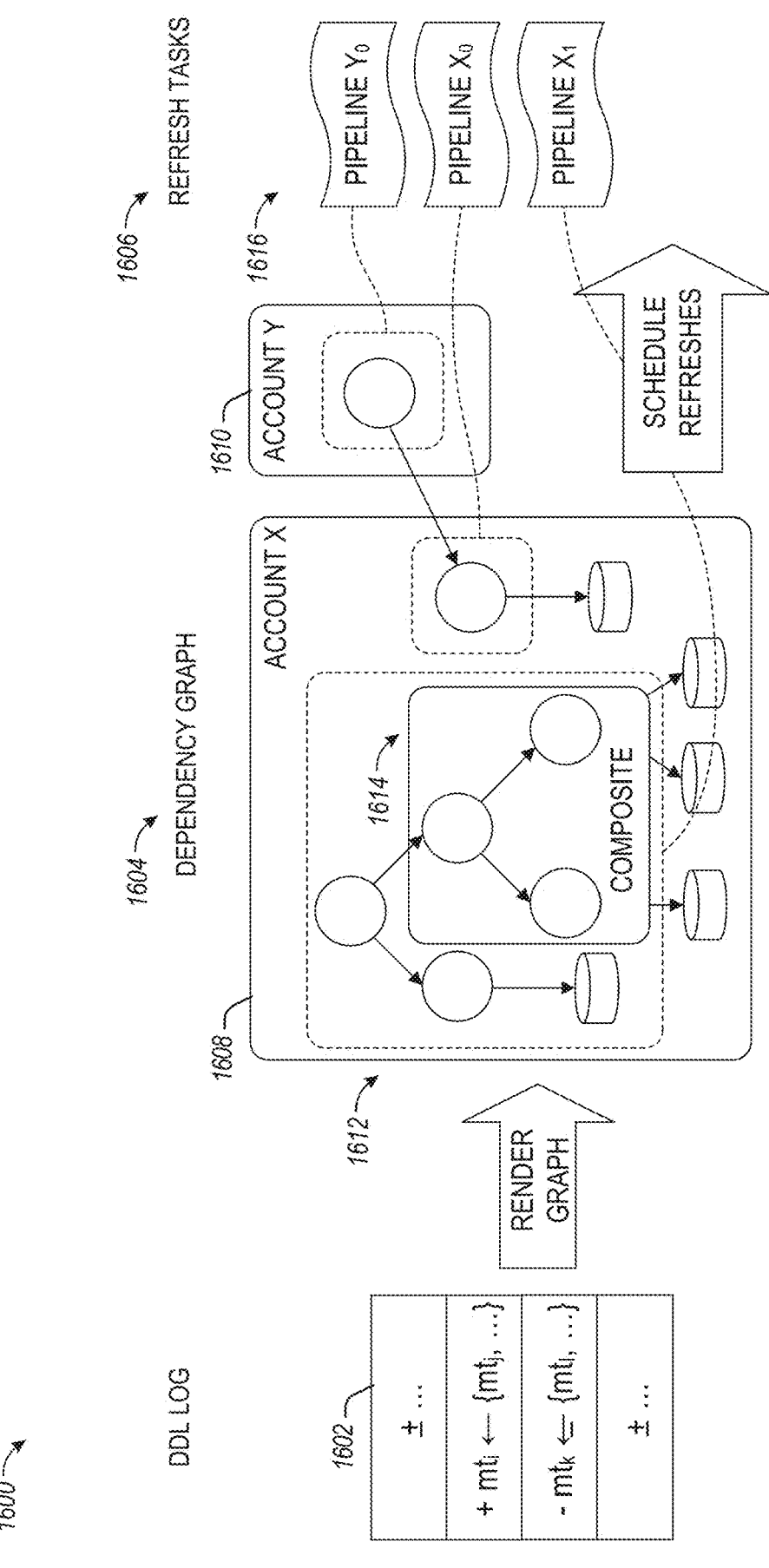
FIG. 16 is a diagram illustrating the generation of an MT dependency graph partitioned into pipelines for scheduling refreshes of MTs, in accordance with some embodiments of the present disclosure.

FIG. 16 is a diagram 1600 illustrating generation of an MT dependency graph partitioned into pipelines for scheduling refreshes of MTs, in accordance with some embodiments of the present disclosure.

In some aspects, MTs can be periodically refreshed, ordered by dependency. This can be done by two components. Per-account processing can consume the MT DDL change log 1602 and render it into a snapshot of the MT dependency graph 1604. The dependency graph 1604 can be partitioned to show MT dependencies associated with one or more user accounts (e.g., a data provider or a data consumer account in the network-based database system 102). For example, dependency graph 1604 includes dependency graph 1608 associated with MTs 1612 for account X (e.g., a first data processing account of a data provider or a data consumer) as well as dependency graph 1610 of one or more MTs associated with account Y (e.g., a second data processing account of a data provider or a data consumer). In some aspects, the MT dependencies in a dependency graph can be associated with a composite MT (e.g., composite MT 1614 which can include at least one MT depending upon at least two other MTs). Upon performing a graph refresh operation, one or more refresh tasks 1606 can be performed, where each refresh task can be configured to run a separate pipeline (e.g., one of pipelines 1616). In this regard, processing in pipelines 1616 can be sharded and performed in parallel for increased efficiency.

In some aspects, the MT manager 128 associates MTs in a dependency graph with corresponding pipelines 1616 and enqueues scheduled tasks of the MTs for processing of each pipeline. The partitioning can be used to minimize the number of dependencies between pipelines.

In some aspects, the refresh task is given a pipeline and invokes the refresh operation on each MT in dependency order. The refresh task can track two kinds of dependencies: intra-pipeline and inter-pipeline dependencies. Intra-pipeline dependencies are resolved using the structure of the pipeline itself. Inter-pipeline dependencies, which handle MTs on shares, are resolved by polling for the required table version in the dependent MT.

MT Refresh

The process of refreshing an MT is encapsulated in the command ALTER MATERIALIZED TABLE <name> REFRESH [AT( . . . )]. Each MT refers to its definition, an index to the fragment it represents, and a hash of the plan that the fragment represents. Accordingly, a refresh for an MT can be configured as follows:

(a) The MT enclosing definition is fetched, either from its own Data Persistence Object (DPO) or its parent's if it is an intermediate MT. As used herein, the term DPO indicates an abstraction that defines how metadata objects are stored in a database.

(b) The definition is expanded as a view and translated into a query plan.

(c) The query plan is fragmented using the same algorithm used during creation.

(d) The fragment corresponding to the current MT is extracted from the fragmented plan.

(e) The refresh plan is rewritten into a merge DML (e.g., as illustrated in Table 6).

TABLE 6

```
MERGE INTO <mt>
USING (SELECT * FROM <fragment> CHANGES(. . .)) delta
ON METADATA$ROW_ID = delta.METADATA$ROW_ID
WHEN . . .
```

Figure 17:
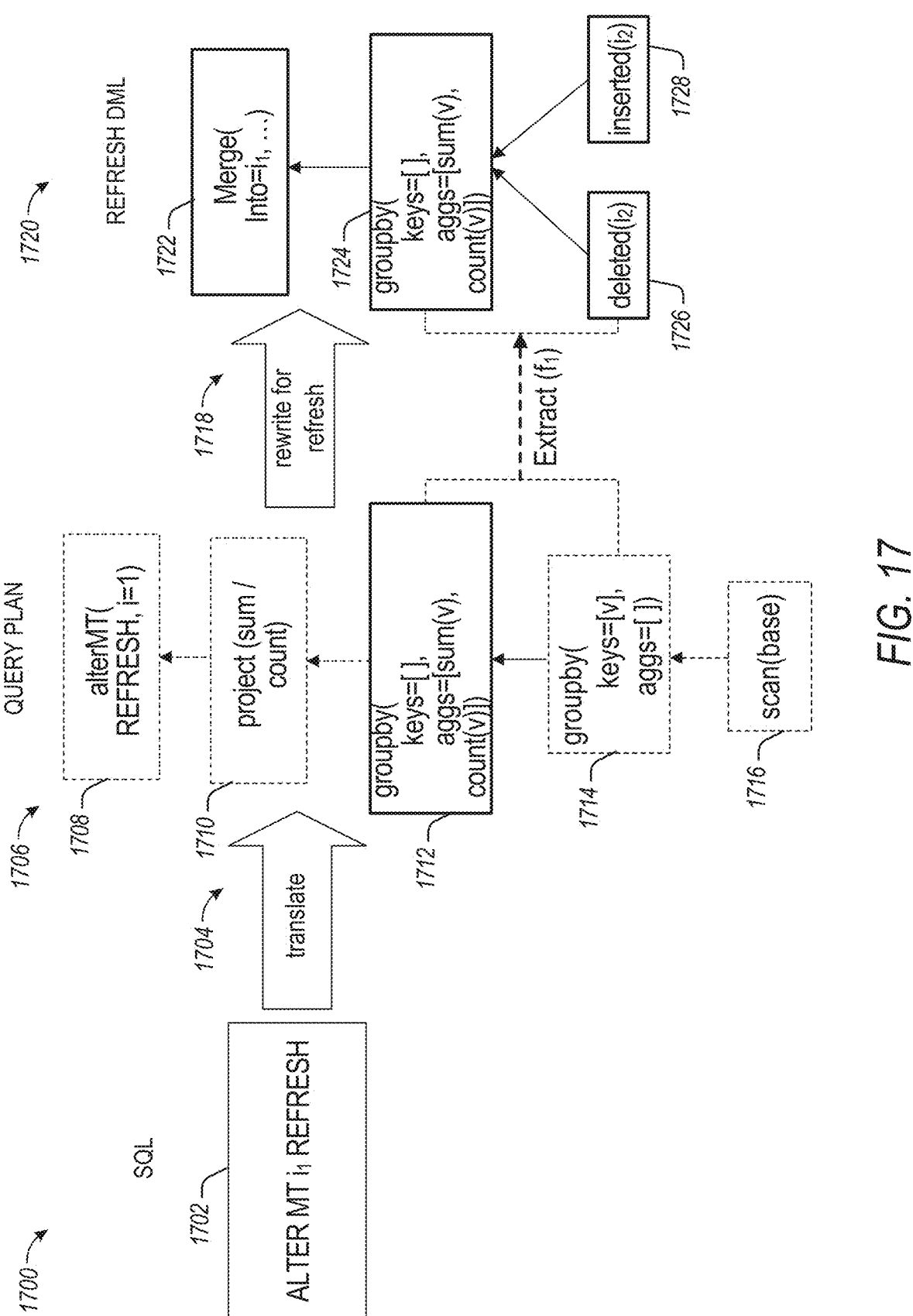
FIG. 17 is a diagram illustrating a process for refreshing an MT, in accordance with some embodiments of the present disclosure.

FIG. 17 is a diagram 1700 illustrating a process for refreshing an MT, in accordance with some embodiments of the present disclosure.

Reusing the example query above, the process can be implemented as a rewrite of the expanded query plan. Diagram 1700 shows the alter-refresh plan being rewritten into the appropriate merge plan. More specifically, MT command 1702 is translated at operation 1704 to generate query plan 1706, which includes a Scan operation 1716, GroupBy operations 1714 and 1712, a Project operation 1710, and an AlterMT operation 1708. At refresh rewrite operation 1718, fragment number 1 (e.g., fragment f1) is extracted and plugged into the merge plan during refresh operation 1720. Then change rewrite converts the fragment into a plan that produces inserts 1728, deletes 1726, and updates, producing per-partition aggregates from GroupBy's (e.g., by applying the deletes 1726 and inserts 1728 to the GroupBy operation 1724 and then performing a Merge operation 1722 into the MT to perform the refresh).

MT Query

Figure 18:
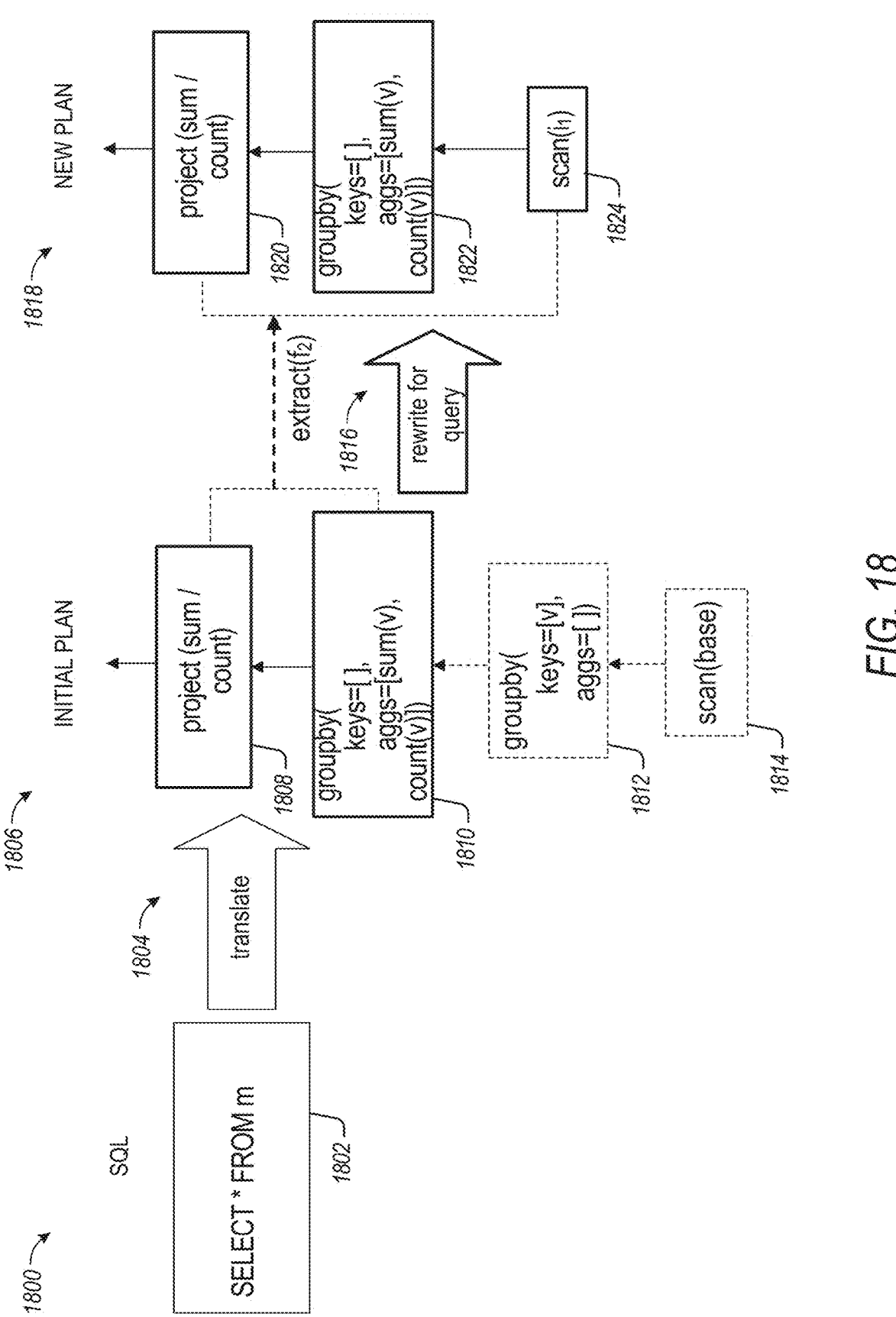
FIG. 18 is a diagram illustrating the execution of a Select operation on an MT, in accordance with some embodiments of the present disclosure.

FIG. 18 is a diagram 1800 illustrating the execution of a Select operation 1802 on an MT, in accordance with some embodiments of the present disclosure.

To execute SELECT on an MT, it may be insufficient to replace the MT with a table scan, since the top fragment of the query may have a Projection or a GroupBy. Thus, the following process (similar to the earlier steps) can be followed:

(a) Expand the MT definition as a view and translate it (e.g., at translation operation 1804) into an initial query plan 1806 (which includes a Scan operation 1814, GroupBy operations 1812 and 1810, and a Project operation 1808).

(b) Fragment the plan.

(c) Extract the root fragment (e.g., fragment f2).

(d) Replace the unextracted inputs with scans of the corresponding MT(s) (e.g. 1824).

Returning to the above running example in FIG. 18, this processing would extract the Projection and top GroupBy, substituting a scan on MT $i_1$, which contains per-partition aggregates, as the input of the group-by. In this regard, a new query plan 1818 is generated as a result of the rewrite operation 1816, where the new query plan 1818 includes a Scan operation 1824, a GroupBy operation 1822, and a Project operation 1820.

Each of the four phases discussed above can be configured to cleanly fragment the plan and perform operations on those fragments. In some aspects, the fragmentation can be configured to satisfy the following properties: repeatable across instances and releases; and each can contain operations that can be incrementalized without any intermediate state. The fragmented plan can be configured to support the following operations: create a fragmented plan from a query plan; get a dependency graph of the tables in the plan (vertices are either intermediate MTs represented by their index, user MTs, or base tables; and edges represent read dependencies, and are used by the scheduler to order refreshes); obtain the output schema of a fragment (this functionality can be used to create intermediate MTs with the appropriate columns); obtain the hash of a fragment (this functionality can be used to detect when an MT or view has been redefined); and extract a fragment as a query plan (inputs corresponding to intermediate MTs may be substituted with table scans; and the top node can connect expressions in the original query plan with new output expressions, which may replace complex expressions with column references to intermediate MTs).

In some aspects, the fragmentation process can be configured to operate on the query plan in a particular form. In this regard, the following rewrites can be configured to happen before fragmentation:

(a) Expression rewrites, which decompose aggregate functions into their constituents, are needed to get the output schema of a fragment and incrementalize the aggregate correctly.

(b) Several rewrites simplify the plan representation, which makes the logic to decide fragments much simpler. These include distinct rewrite (GroupByImpl), window function rewrite (WindowFunctionImpl), subquery unnesting; and GroupBy pushdown (which may be useful for per-partition aggregates, where a per-partition GroupBy feeding into the intermediate MT and an overall GroupBy may be desired when reading the intermediate MT).

(c) Some rewrites do optimizations that can only be done before fragmentation:

(c.1) Filter push down. This functionality may be important since an aggressive filter high in a plan could save significant resources when computing intermediate state lower down. A round filter pulling may be used to make pushdown effective.

(c.2) Join elimination. This functionality may be done based on symbolic properties (like false predicates), not dynamic properties, and simplification would be beneficial.

(c.3) GroupBy pushdown. This functionality may or may not be useful, since it introduces additional GroupBy's to incrementalize.

In some aspects, incremental refresh can include rewriting a query into a form that computes the changes in that query between two times (a process referred to as change rewriting). In some aspects, change rewrites allow queries to request the differences in a query between two times. In some aspects, a change rewrite is represented as a special "changes" node in the query plan above the query that needs rewriting. A set of rewrite rules can be used to pattern-match the query below the changes node and convert it into a query that produces the requested changes. Some operators can be stateless, which means that their changes can be computed efficiently without storing any intermediate state between invocations (such operators include filters, projections, union-all, and inner joins).

Other operators are stateful, which requires storing an intermediate state. This state can be stored in a hidden MT, and change rewrites will replace a stateful subquery with a scan on its corresponding hidden MT. Stateful operators include group-by, distinct, outer joins, semi-joins, and window functions.

Figure 19:
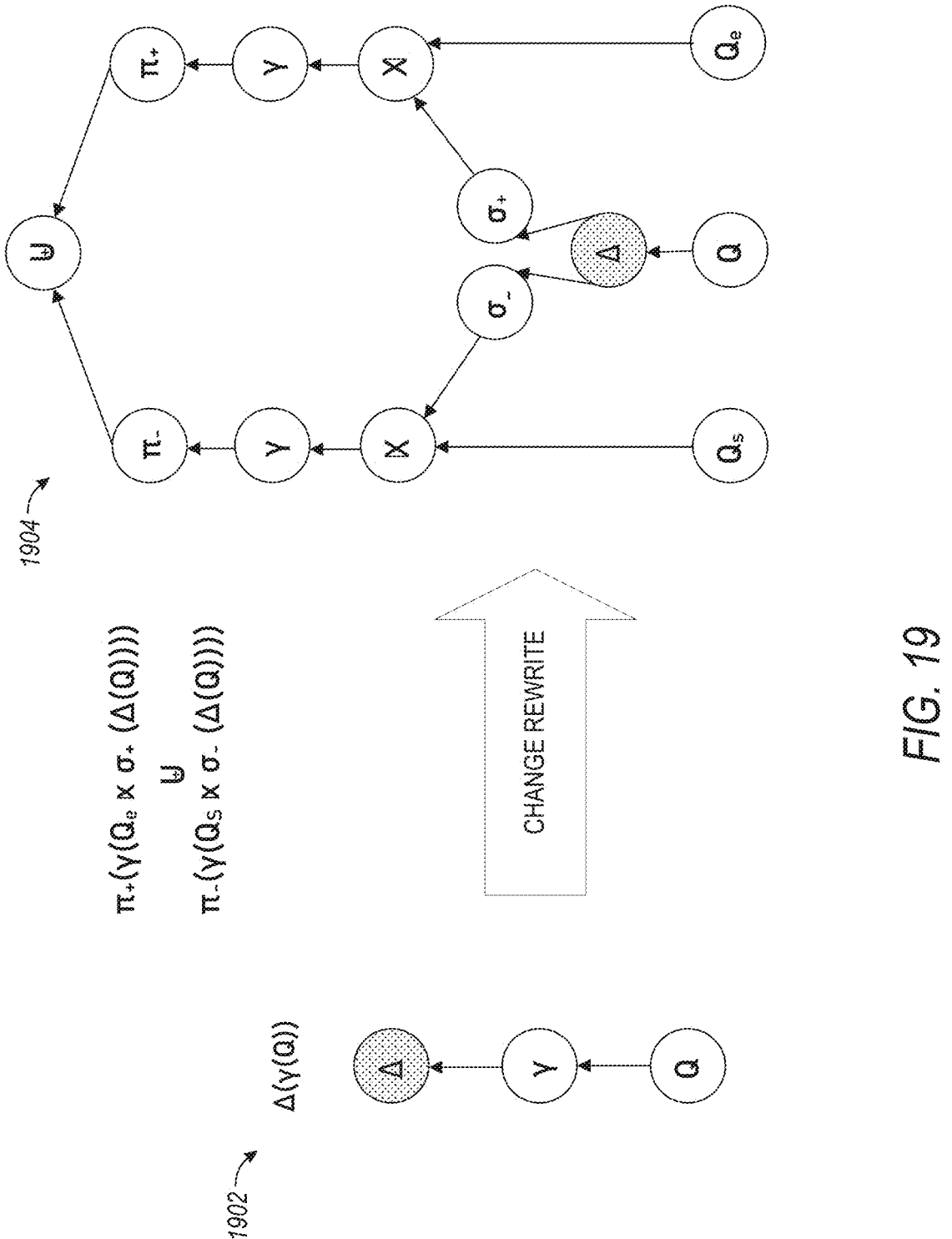
FIG. 19 is a diagram of a change rewrite for a GroupBy operation for determining a delta to a base station for an MT refresh, in accordance with some embodiments of the present disclosure.

FIG. 19 is a diagram 1900 of a change rewrite for a GroupBy operation for determining a delta to a base table for an MT refresh, in accordance with some embodiments of the present disclosure. Referring to FIG. 19, Q indicates an abstract query 1902, γ is a GroupBy operator (e.g., including a key and aggregate functions). During a change rewrite, a determination is made on not only which rows in Q changed but also which groups in the result changed. Qs indicates the query at a start time and Qe indicates the query Q at an end time. The change rewrite results in a union 1904 between π− (an overall set of invalidated groups) and π+ (the new versions of the rows that changed).

In some aspects, aggregates for stateful MTs can be maintained in different ways depending on the operation:

(a) Output as an intermediate state: Commutative+Associative+Invertible with no final op aggregates may be incrementally accumulated in the output table itself, and thus may require no additional intermediate MTs from the perspective of change rewrites. Example operations include SUM, COUNT, and COUNT_IF.

(b) Intermediate state followed by additional post-processing: All other Commutative+Associative aggregates may be incrementally accumulated into an intermediate state table, followed by a scalar project (Commutative+Associative+Invertible with final op) and/or an additional partition-wise aggregation (Commutative+Associative but not invertible) to create the final output.

Intermediate state tables can be maintained in hidden MTs owned by and accounted to the user-defined MT. Change rewrites can split aggregate maintenance into two steps: maintenance of intermediate state and post-processing and/or materialization of final results.

Invertible operations may include AVG, VARIANCE, COVAR, STDDEV, REGR_*, CORR, KURTOSIS, SKEW, OBJECT_AGG, LISTAGG1, ARRAY_AGG1, BIT*_AGG2, and BOOL*_AGG2.

Non-invertible operations may include MIN, MAX, HASH_AGG, ANY_VALUE1, HLL, APPROX_PERCENTILE, APPROX_TOP_K, and APPROXIMATE_SIMILARITY.

(c) Partition-wise full refresh only. All other aggregate operations may require O(N) space to provide the above incremental properties, and thus imply partition-wise full refresh materialization. However, Commutative+Associative approximations may exist for all of the following operations which can be used in aggregation: MEDIAN, MODE, PERCENTILE.

Additional configurations for aggregates are discussed hereinbelow.

Incremental computation of aggregation operations may use some form of a persistent, intermediate state. The types of aggregate operations fall into several categories, which require a few different implementation approaches to support efficiently. From an incrementalization perspective, aggregate operations fall into three categories:

(a) Commutative+Associative+Invertible, both with and without final operations. The results of these operations can be incrementally updated using only the changes to the input rows. Example operations include no final op: SUM, COUNT, COUNT_IF; final op: AVG, VARIANCE, COVAR, STDDEV, REGR_*, CORR, KURTOSIS, SKEW, OBJECT_AGG, LISTAGG1, ARRAY_ AGG1, BIT*_AGG2, BOOL*_AGG2.

(b) Commutative+Associative (but not invertible), both with and without final operations. These can be partially aggregated and stored, but the final results have to be recomputed every time an input changes. Example operations include no final op: MIN, MAX, HASH_AGG, ANY_VALUE1; final op: HLL, APPROX_PERCENTILE, APPROX_TOP_K, APPROXIMATE_SIMILARITY.

(c) Everything else: These operations all require O(N) space (where N is the size of the largest group) to achieve any of the above properties, thus requiring partition-wise full refresh for both INSERT and DELETE. Of note, commutative+associative approximation algorithms can be used for all operations in this category. Example operations include MEDIAN, MODE, and PERCENTILE.

From a state management perspective, these operations can map onto four different approaches:

(a) Output the final state, for Commutative+Associative+Invertible operations with no final operation. In this case, aggregates are incrementally accumulated on a row-wise basis directly in the output table. Example operations include SUM, COUNT, and COUNT_IF.

(b) Intermediate state containing full aggregates, with scalar projection to final output, for Commutative+Associative+Invertible operations with a final operation. In this case, intermediate aggregates are incrementally accumulated on a row-wise basis in a hidden, separate intermediate state table, after which they are projected into the final result via a scalar operation (likely as a runtime view operation, but potentially via a full materialization). Example operations include AVG, VARIANCE, COVAR, STDDEV, REGR_*, CORR, KURTOSIS, SKEW, OBJECT_AGG, LISTAGG, ARRAY_AGG, BIT*_AGG, BOOL*_AGG.

(c) Intermediate state containing partition-wise partial aggregates, with a final full aggregation, for Commutative+Associative (but not invertible) operations. In this case, per-partition aggregates are stored in an intermediate table. These aggregates are updated as changes are made on the base tables using only the changed partitions. To read from the intermediate table, the partial aggregates must be fully aggregated, optionally with a projection to the final value.

(d) Per-key full refresh, for everything else. In this case, a full refresh is needed to recompute aggregates. However, only the keys which have changed in the GROUP BY need to be recomputed, so incremental maintenance can often proceed at a lower cost than a full refresh of the entire view.

For approaches requiring an independent intermediate state, that state will be maintained as a hidden MT, owned by and accounted to the user-defined MT. These approaches are discussed in more detail below.

The following provides a more detailed description of the specific shape of maintenance plans for the various approaches described above. For all cases, the following notation is used to describe the various operations involved in computing an aggregate:

(a) AGG: the overall aggregate fn. [TI]→TO.

(b) ACC: accumulate inputs into the intermediate state. [TI]→TC.

(c) COMBINE: combine intermediate states: [TC]→TC.

(d) EXTRACT: compute the final result: TC→TO.

(e) INV: invert an intermediate state: TC→TC.

EXTRACT and INV may not apply to all aggregates. Aggregates with a final operation involve some sort of intermediate state, with an operation to extract the final value. For example, AVG has an intermediate state of (sum, count), and the final op is sum/count. Aggregates that are not invertible lack INV.

The following configurations can be used for computing deltas for GROUP BY.

For a table or view I (K Any, V TI) and view O as SELECT AGG(V) AS R GROUP BY K. To update O based on ΔI:

(a) Commutative+Associative+Invertible. The following configurations may be used: TC=TO, AGG_EXTRACT is identity; this composes with any view for which we can compute the delta; requires that O is a materialized view; this does not distinguish between identity elements and nulls; however, if a count (and maybe the intermediate state) is stored in a hidden column, this issue can be fixed and additionally generalize to all C+A+I aggregates.

In some aspects, O can be updated directly with the following commands listed in Table 7:

TABLE 7

```
MERGE INTO O USING
  (SELECT, K, COMBINE(R) AS R FROM
  (SELECT K, ACC(V) AS R FROM ΔI WHERE M$ACTION = 'I' GROUP BY
K
  UNION ALL
  SELECT K, INV(ACC(V)) AS R FROM ΔI WHERE M$ACTION = 'D'
GROUP BY K
  )) TEMP
ON O.K = TEMP.K
WHEN MATCHED
  UPDATE SET O.R = COMBINE(O.R, TEMP.R)
WHEN NOT MATCHED
  INSERT (K, R) VALUES (TEMP.K, TEMP.R);
```

(b) Commutative+Associative+Invertible, with the final operation. Summary: maintain an intermediate value and count per key, and update that as needed from input deltas. An intermediate table, INT (K Any, C TC, CNT INT) can be used. ΔO can be computed without materializing O, so this composes cleanly into larger view definitions. Additionally, it only depends on ΔI. In other words, this is a general-purpose change rewrite that can be layered on top of joins, etc. The state can be updated with the following commands listed in Table 8:

TABLE 8

```
MERGE INTO INT USING
  (SELECT K, COMBINE(C) AS C, SUM(CNT) AS CNT FROM
  (SELECT K, ACC(V) AS C, COUNT(V) AS CNT FROM ΔI
    WHERE MD$ACTION = 'INSERT' GROUP BY K
  UNION ALL
  SELECT K, INV(ACC(V)) AS C, –1 * COUNT(V) AS CNT FROM ΔI
    WHERE M$ACTION = 'DELETE' GROUP BY K
  ) GROUP BY K) TEMP
ON INT.K = TEMP.K
WHEN MATCHED AND INT.CNT + TEMP.CNT > 0 THEN
  UPDATE SET INT.C = COMBINE(INT.C, TEMP.C),
    INT.CNT = INT.CNT + TEMP.CNT
WHEN MATCHED AND INT.CNT + TEMP.CNT = 0 THEN
  DELETE
WHEN NOT MATCHED THEN
  INSERT (K, C, CNT) VALUES (TEMP.K, TEMP.C, TEMP.CNT);
```

ΔO can be computed as SELECT K, EXTRACT (C) AS R, MD$ACTION, MD$ISUPDATE, MD$ROWID FROM ΔINT.

If O is an MT, then O can be updated with the following commands listed in Table 9:

TABLE 9

```
MERGE INTO O USING (
  SELECT * FROM ΔO WHERE NOT(MD$ACTION = DELETE AND
MD$ISUPATE)
ON O.K = ΔO.K
WHEN MATCHED AND MD$ACTION = 'DELETE AND NOT
MD$ISUPDATE THEN
  DELETE
WHEN MATCHED AND MD$ACTION = 'INSERT' AND MD$ISUPDATE
THEN
  UPDATE SET O.R = ΔO.R
WHEN NOT MATCHED AND MD$ACTION = 'INSERT' AND NOT
MD$ISUPDATE THEN
  INSERT (K, R) VALUES (ΔO.K, ΔO.R);
```

(c) Commutative+Associative (with or without final op). Summary: maintain intermediate value per key and input partition. Need an intermediate table, INT (P VARCHAR, K Any, C TC). ΔO can be computed without materializing O, so this composes into larger view definitions. However, it requires access to the partition of a row in ΔI, which can be possible for partition-preserving operators (specifically select, project, union all, changes). This is still a change rewrite that can be used inside a complex view definition, but it requires materializing I if it is not already. Processing may require GC. The state can be updated with the following commands listed in Table 10:

TABLE 10

```
INSERT INTO INT
SELECT METADATA$PARTITION_NAME AS P, K, ACC(V) AS C
FROM ΔI WHERE METADATA$ACTION = 'INSERT'
GROUP BY P, K;
```

This will be executed whenever the Stream is selected and new versions are discovered. When the Stream is advanced, the rows for partitions from the old offset(s) can be deleted. ΔO can be computed with the following commands listed in Table 11:

TABLE 11

```
WITH
   P_OLD AS SELECT DISTINCT P FROM IBEGIN,
   P_NEW AS SELECT DISTINCT P FROM IEND,
   P_UNCHANGED AS
      SELECT P FROM P_OLD INTERSECT SELECT P FROM P_NEW,
   P_ADDED AS SELECT P FROM P_OLD MINUS SELECT P FROM P_NEW,
   P_DELETED AS SELECT P FROM P_NEW MINUS SELECT P FROM
P_OLD,
   P_ALL AS SELECT P FROM P_OLD UNION SELECT P FROM P_NEW,
   TEMP AS
      SELECT K, EXTRACT(COMBINE(C)) AS R,
         COUNT_IF(P IN P_ADDED) AS ADDED,
         COUNT_IF(P IN P_DELETED) AS DELETED,
         COUNT_IF(P IN P_UNCHANGED) AS UNCHANGED,
         ??? AS MD$ROWID
      FROM INT JOIN P_ALL ON P
      GROUP BY K
      HAVING ADDED > 0 OR DELETED > 0
SELECT K, R, 'INSERT' AS MD$ACTION, MD$ROW_ID,
DELETED > 0 OR UNCHANGED > 0 AS MD$ISUPDATE
WHERE ADDED > 0
FROM TEMP
UNION ALL
SELECT K, R, 'DELETE' AS MD$ACTION, MD$ROW_ID,
   ADDED > 0 OR UNCHANGED > 0 AS MD$ISUPDATE
WHERE DELETED > 0
FROM TEMP
```

If O is an MT, it can be updated as with the invertible case, or potentially replaced entirely if it is small.

Other configurations include the following. MEDIAN, PERCENTILE, and MODE all have approximate algorithms that are commutative+associative.

State management configurations include the following. Each MT owns the intermediate tables required to compute it. These tables are themselves MTs defined as fragments of the user-defined MT. They are nested objects hidden from the user, and with costs attributed to the user-defined MT. The intermediate MTs are determined by compiling the maintenance plan for a user-defined MT. The MT definition is first split into fragments, each corresponding to an intermediate MT, then the appropriate fragment is extracted and optionally placed under a Changes node. The maintenance plan contains change queries, which lead to change rewrites being invoked. The following commands listed in Table 12 can be used:

TABLE 12

```
-- User DDL
create materialized view mt as
   select k, t1.c1, mt2.c2
```

TABLE 12-continued

```
   from t1 join (
      select k, count( ) c2
      from tb
      group by k
   ) mt2 using (k)
-- Consequent, hidden DDL
create hidden3 materialized view mt.mt2 as
   select k, count( ) c2
   from tb
   group by k
-- Initial maintenance plan
merge into mt using (
   select * from (
      select k, t1.c1, mt2.c2
      from t1 join (
         select k, count( ) c2
         from tb
         group by k
      ) mt2 using (k)
   ) changes(. . .) at($prev_tick) end($next_tick)
) . . .;
-- Rewritten maintenance plan
merge into mt using (
   select * from (
      select k, t1.c1, mt2.c2
      from t1 join nested_object('mt.mt2') mt2 using (k)
   ) changes(. . .) at($prev_tick) end($next_tick)
) . . .;
```

To ensure that refreshes work correctly, intermediate MTs are added to the MT graph, with the user-defined MT depending on them instead of directly on the tables specified in the query. This provides encapsulation as follows:

(a) Change rewrites take care of which operators are stateful.

(b) The change-query context handles the mapping of subqueries to intermediate MTs.

(c) The MT dictionary object manages the lifetime of its nested objects.

(d) The maintenance plan and scheduler do not interact with these concepts; they see the whole set of user-visible and hidden MTs.

The following window functions may be configured. The ability to incrementally maintain window aggregates depends on the configuration of the OVER clause and the aggregation function. For some aggregation functions that are computed on a complete window, it is similar to the GROUP BY case. For example, the intermediate state of aggregation as defined by the following view listed in Table 13 can be maintained similarly to a GROUP BY COUNT aggregate.

TABLE 13

```
SELECT K, COUNT(K) OVER (
    PARTITION BY K
    ORDER BY x
    BETWEEN UNBOUNDED PRECEDING AND UNBOUNDED
FOLLOWING)
FROM I;
```

For the final view, it would need to be joined (merged) on the partitioning key K.

The result of window functions that are defined on a partial window frame is order sensitive and difficult to maintain. Adding a single row to a base relation can affect all rows of MT.

In some aspects, the default behavior of aggregation functions can be considered. For example, the default behavior of non-rank-related functions (COUNT, MIN/MAX, SUM, . . . ) is RANGE BETWEEN UNBOUNDED PRECEDING AND CURRENT ROW while the default of rank-related functions (FIRST_VALUE, LAST_VALUE, . . . ) is ROWS BETWEEN UNBOUNDED PRECEDING AND UNBOUNDED FOLLOWING.

In some aspects, streams on views that would require a state can be disallowed. Instead, users can create streams on MTs. These streams see the current state of the MT, observing the same lag as the MT. This allows such streams to work on MTs unchanged. In some aspects, zero-lag MTs can be configured, which would lead to support for streams on zero-lag MTs.

The DISTINCT modifier, though not strictly an aggregate function itself, can be an important primitive for aggregates like COUNT, certain joins, etc. An incremental DISTINCT may be implemented under the cover as a separate aggregation where the intermediate state is a map of counts.

In some aspects, querying MTs allows users to trade between cost, latency, and consistency. By default, queries will get the current state of each MT in a query. Given a query referencing multiple MTs or tables, the query may not yield a consistent snapshot. In some aspects, users will be able to specify AT (LAST SNAPSHOT) on a subquery to get the most recent, currently-materialized consistent snapshot across the subquery. This may require rewinding all of the tables or MTs in the subquery to a previous timestamp.

In some aspects, the time at which the MT was last refreshed can be provided using a new metadata column, METADATA$MT_LAST_REFRESH_TIME, which can be available when selecting from MTs.

In some aspects, the following system function can be provided for explicitly resolving the most recent snapshot across a set of MTs: SYSTEM$MT_LAST_SNAPSHOT (<MAX TIME>, <MTS . . . >).

In some aspects, users can observe the state of their MT graphs via several interfaces. Account usage views can provide needed information and can be queried directly. A user interface (UI) presenting the view graph can be configured. Additional configurations regarding observability are provided herein below.

Example use cases for observability include is/are my pipeline(s) healthy; is this view healthy; if the query is failing, why; if its actual lag is greater than the target lag, why; how much does my pipeline/view cost; how much would it cost to decrease its lag; and how much are my pipeline's results being used.

Observability implementation configurations may include the following. All information can be published from the metadata database to INFORMATION_SCHEMA and ACCOUNT_USAGE. MaterializedTableRefreshHistoryDPO can be used for storing info about each MT at each refresh version. MaterializedTableGraphHistoryDPO can be used for storing a history of which MTs exist over time. In some aspects, a scheduling process will populate the MaterializedTableGraphDPO as well as the initial entries of the MaterializedTableViewStatusDPO (in-state "SCHEDULED"). In some aspects, the MaterializedTableComputationTask can update the MaterializedTableViewStatus's dynamic fields (state, start_time, completed_time, etc.) as each state transition happens. In some aspects, the transitions are all monotonic, so they can be recorded as soon as they happen, and do not need to wait for the overall pipeline to finish.

In some aspects, the following interfaces can be used for observability.

(a) UI. Dynamic graph visualization is a key component of good observability. Graph visualization can be used, with enough information to write ACCOUNT_USAGE queries based on it.

(b) View and Pipeline Dashboards. Dashboard templates can be provided for users to monitor pipeline latencies. Examples of useful queries for monitoring can be provided.

(c) Information Schema Table Functions.

The following MATERIALIZED_TABLE_REFRESH_HISTORY configurations can be used. This table function returns information about each refresh (completed and running) of MTs. Example arguments are listed in Table 14 below:

TABLE 14

| Name | Type | Description |
| --- | --- | --- |
| REFRESH_VERSION_RANGE_START | Timestamp | Lower bound of refresh versions to include. Defaults to now( )-7 d, cannot be less than now( )-7 d |

TABLE 14-continued

| Name | Type | Description |
|---|---|---|
| REFRESH_VERSION_RANGE_START | Timestamp | Upper bound of refresh versions to include. Defaults to now( ) |
| RESULT_LIMIT | Number | Max number of rows to return. Default 100, max 10 k |
| ERROR_ONLY | Boolean | If true, only return refreshes that are completed with an error status. Defaults to false |
| NAME | Varchar | If non-empty, only return refreshes for MTs with an exact name match. Defaults to " " |

Example schema is provided in Table 15 below:

TABLE 15

| Column Name | Type | Description |
|---|---|---|
| NAME | Text | Name of the MT |
| SCHEMA_NAME | Text | |
| DATABASE_NAME | Text | |
| JOB_START_TIME | Timestamp | The time when the refresh job started |
| COMPLETED_TIME | Timestamp | The time when the refresh completed |
| STATE | Text | Same as TASK_HISTORY STATE |
| ERROR_CODE | Number | If refresh encountered an error, the code. |
| ERROR_MESSAGE | Text | If refresh encountered an error, the message. |
| AS_OF | Timestamp | Transactional timestamp at which refresh was evaluated. |
| COMPLETION_TARGET | Timestamp | Time by which this refresh should complete to keep lag under the table's TARGET_LAG. Equal to the previous AS_OF + ARGET_LAG |
| NOTE_ID | Text | ID to use in graph queries, easier than using DB_NAME \|\| '.' \|\| SCHEMA_NAME \|\| '.'\|\| NAME |
| QUERY_ID | Text | Query which produced the results. These queries don't show up in the query history listing by default but can be directly linked to |
| LAST_READY_INPUT_ID | Text | NODE_ID of the dependency which became available at the latest. If this is equal to NODE_ID represents a dependency on the previous refresh version of the same MT. If different represents a dependency on a different MT at the same refresh version |

The following MATERIALIZED_TA-BLE_GRAPH_HISTORY configurations may be used. This table function returns the MTs in an account at the specified time. Example arguments are listed in Table 16 below:

TABLE 16

| Name | Type | Description |
|---|---|---|
| AS_OF | Timestamp | Time at which to return the state of the graph, in the same time domain as REFRESH_VERSION_RANGE_{START, END} above. Defaults to null which indicates returning the current state. |

Example schema is provided in Table 17 below:

TABLE 17

| Field | Type | Comment |
|---|---|---|
| NAME | Text | Name of this MT |
| NODE_ID | Text | Node ID in the graph |
| INPUT_IDS | Array (Text) | Inputs to the node |
| VALID_FROM | Timestamp | Entry is part of the graph after this time |
| VALID_TO | Timestamp | If present, the entry is not part of the graph after this time |
| TARGET_LAG_MS | Number | Target lag of this MT |
| QUERY_TEXT | Text | The SQL definition of this MT |

The following account usage views configurations may be used. In addition to the information scheme functions that return the last seven days of history, views in the Account Usage share for longer data retention can be used as well. The view for MATERIALIZED_TABLE_REFRESH_HIS-TORY will have the same schema, and the view for MATE-RIALIZED_TABLE_GRAPH_HISTORY will need two additional Timestamp-valued fields: VALID_FROM and VALID_TO.

In some aspects, the following DPOs may be used in connection with MT-related functions.

(a) MaterializedTableRefreshHistoryDPO.

Every refresh can be present as an entry in HISTORY_S-LICE and NAME_SLICE. In addition, failed refreshes are also in ERRORS_SLICE to facilitate fast lookups for erro-r_only queries. The data size of each entry is relatively small, so we can duplicate it across all slices to reduce a database (e.g., foundation database or FDB) load while scanning.

To export to account usage, HISTORY_SLICE can be split into RUNNING_SLICE and HISTORY_SLICE based on whether a refresh is completed, and then only export HISTORY_SLICE. Example configurations are listed in Table 18 below:

TABLE 18

```
@DPOEntity(
slices = {
@DPOSlice(
// Stores data about all refreshes
name = HISTORY_SLICE,
keys = {
ACCOUNT_ID,
REFRESH_VERSION,
ID,
},
values = {
NAME,
SCHEMA_NAME,
DATABASE_NAME,
JOB_START_TIME,
COMPLETED_TIME,
STATE,
ERROR_CODE,
ERROR_MESSAGE,
QUERY_ID,
NODE_ID,
COMPLETION_TARGET,
LAST_COMPLETED_DEPENDENCY,
}),
// Refreshes indexed by name to support efficient lookups
@DPOSlice(
name = BY_NAME_SLICE,
keys = {
ACCOUNT_ID,
NAME,
REFRESH_VERSION,
ID,
},
values = {
SCHEMA_NAME,
DATABASE_NAME,
JOB_START_TIME,
COMPLETED_TIME,
STATE,
ERROR_CODE,
ERROR_MESSAGE,
QUERY_ID,
NODE_ID,
COMPLETION_TARGET,
LAST_COMPLETED_DEPENDENCY,
}),
// Only contains failed refreshes
@DPOSlice(
name = ERRORS_SLICE,
keys = {
ACCOUNT_ID,
REFRESH_VERSION,
ID,
},
values = {
NAME,
JOB_START_TIME,
COMPLETED_TIME,
STATE,
ERROR_CODE,
ERROR_MESSAGE,
QUERY_ID,
NODE_ID,
COMPLETION_TARGET,
LAST_COMPLETED_DEPENDENCY,
})
})
```

(b) MaterializedTableGraphHistoryDPO

Each MT is either in the LIVE_SLICE or HISTORY_S-
LICE. Queries for the current graph hit the live slice, and
queries for past points in time scan the live slice, filtering on
VALID_FROM <=AS_OF and the history slice with a range
of VALID_TO>AS_OF and a filter of
VALID_FROM<=AS_OF. Example configurations are
listed in Table 19 below:

TABLE 19

```
@DPOEntity(
slices = {
@DPOSlice(
name = LIVE_SLICE,
keys = {
ACCOUNT_ID,
ID,
},
values = {
NAME,
SCHEMA_NAME,
DATABASE_NAME,
VALID_FROM,
NODE_ID,
INPUTS,
TARGET_LAG_MS,
QUERY_TEXT,
}),
@DPOSlice(
name = HISTORY_SLICE,
keys = {
ACCOUNT_ID,
VALID_TO,
VALID_FROM,
ID,
},
values = {
NAME,
SCHEMA_NAME,
DATABASE_NAME,
NODE_ID,
INPUTS,
TARGET_LAG_MS,
QUERY_TEXT,
})
})
```

The following are query examples that can be used in
MT-related processing.

(a) Failures across accounts: SELECT . . . WHERE
STATE="FAILED"; FROM MATERIALIZED_TA-
BLE_REFRESH_HISTORY; ORDER BY AS_OF
DESC.

(b) Missed lag targets across account: SELECT . . .
FROM MATERIALIZED_TABLE_REFRESH_HIS-
TORY; WHERE IFNULL(COMPLETE_TIME,
NOW( ))>COMPLETION_TARGET; ORDER BY
AS_OF DESC.

(c) View instance critical path:
SELECT NAME, AS_OF, END_TIME, END_TIME-
START_TIME AS DURATION; FROM MATERIAL-
IZED_TABLE_REFRESH_HISTORY; START WITH
NAME= . . . AND AS_OF= . . . ; CONNECT BY
NODE ID=PRIOR LAST_READY_INPUT_ID AND
AS_OF=PRIOR AS_OF; ORDER BY END_TIME.

FIG. 20 is a flow diagram illustrating operations of a
database system in performing a method for performing
incremental maintenance of query results, in accordance
with some embodiments of the present disclosure. Method
2000 may be embodied in computer-readable instructions
for execution by one or more hardware components (e.g.,
one or more processors) such that the operations of the
method 2000 may be performed by components of network-
based database system 102, such as components of the
compute service manager 108 (e.g., the MT manager 128)
and/or the execution platform 110 (which components may
be implemented as machine 2100 of FIG. 21). Accordingly,
method 2000 is described below, by way of example with
reference thereto. However, it shall be appreciated that
method 2000 may be deployed on various other hardware
configurations and is not intended to be limited to deploy-
ment within the network-based database system 102.

At operation 2002, a materialized table is created using a table definition. The table definition includes a query on one or more base tables and a lag duration value. The lag duration value indicates a maximum time period that a result of a prior refresh of the query can lag behind a current time instance.

At operation 2004, a delta set for the one or more base tables is determined. The delta set includes at least one change applied to the one or more base tables since the prior refresh of the query. In some aspects, the determining of the delta set for the materialized table is performed by applying change rewrites to the MT query and computing the delta sets for the one or more base tables of the query.

At operation 2006, the delta set is merged with the materialized table to perform an incremental update of the materialized table.

Figure 21:
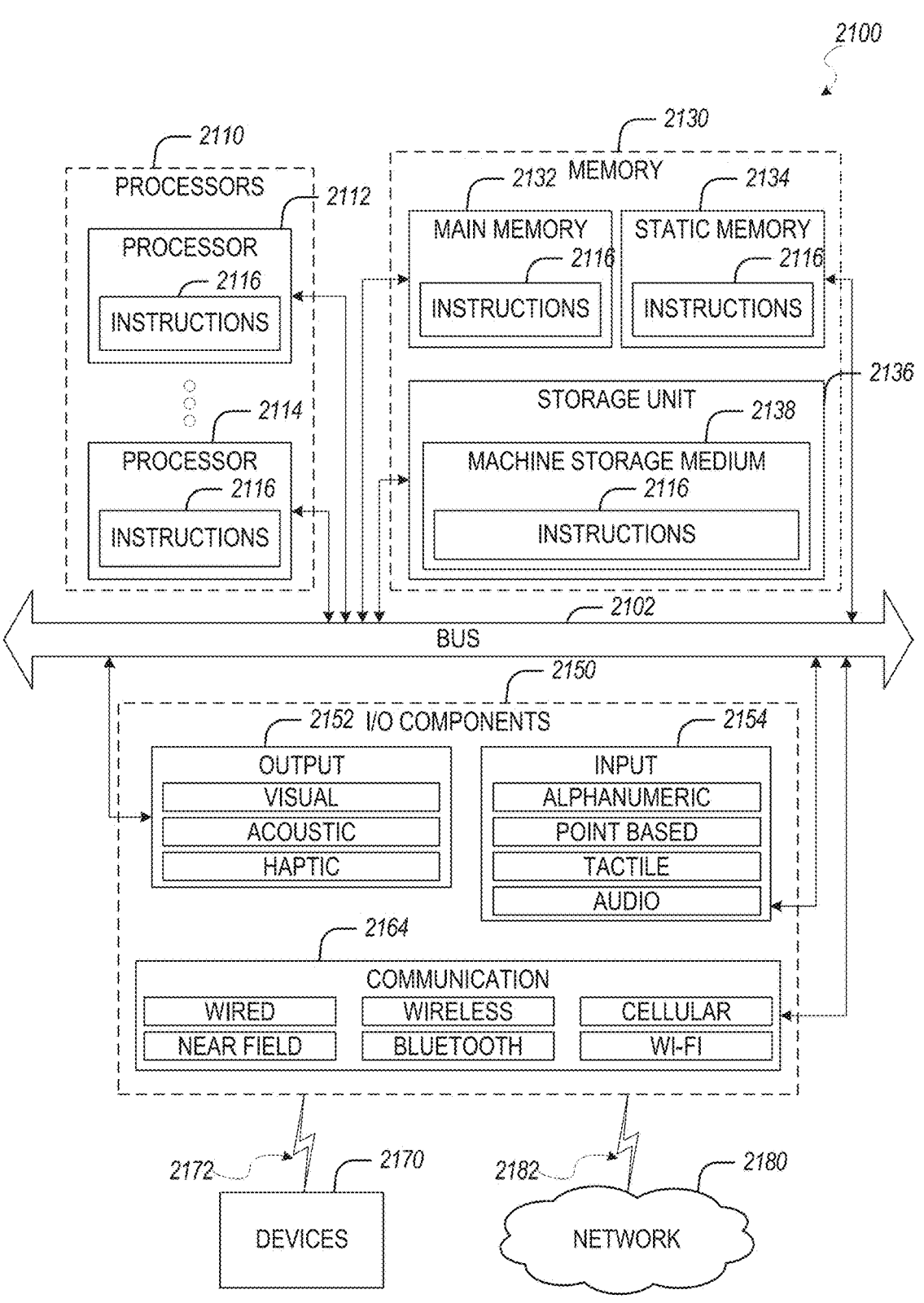
FIG. 21 illustrates a diagrammatic representation of a machine in the form of a computer system within which a set of instructions may be executed for causing the machine to perform any one or more of the methodologies discussed herein, in accordance with some embodiments of the present disclosure.

FIG. 21 illustrates a diagrammatic representation of a machine 2100 in the form of a computer system within which a set of instructions may be executed for causing the machine 2100 to perform any one or more of the methodologies discussed herein, according to an example embodiment. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, instructions 2116 may cause machine 2100 to execute any one or more operations of method 2000 (or any other technique discussed herein, for example in connection with FIG. 4-FIG. 20). As another example, instructions 2116 may cause machine 2100 to implement one or more portions of the functionalities discussed herein. In this way, instructions 2116 may transform a general, non-programmed machine into a particular machine 2100 (e.g., the compute service manager 108 or a node in the execution platform 110) that is specially configured to carry out any one of the described and illustrated functions in the manner described herein. In yet another embodiment, instructions 2116 may configure the compute service manager 108 and/or a node in the execution platform 110 to carry out any one of the described and illustrated functions in the manner described herein.

In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

Machine 2100 includes processors 2110, memory 2130, and input/output (I/O) components 2150 configured to communicate with each other such as via a bus 2102. In some example embodiments, the processors 2110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors (sometimes referred to as "cores") that may execute instructions 2116 contemporaneously. Although FIG. 21 shows multiple processors 2110, the machine 2100 may include a single processor with a single core, a single processor with multiple cores (e.g., a multi-core processor), multiple processors with a single core, multiple processors with multiple cores, or any combination thereof.

The memory 2130 may include a main memory 2132, a static memory 2134, and a storage unit 2136, all accessible to the processors 2110 such as via the bus 2102. The main memory 2132, the static memory 2134, and the storage unit 2136 store the instructions 2116 embodying any one or more of the methodologies or functions described herein. The instructions 2116 may also reside, completely or partially, within the main memory 2132, within the static memory 2134, within machine storage medium 2138 of the storage unit 2136, within at least one of the processors 2110 (e.g., within the processor's cache memory), or any suitable combination thereof, during execution thereof by the machine 2100.

The I/O components 2150 include components to receive input, provide output, produce output, transmit information, exchange information, capture measurements, and so on. The specific I/O components 2150 that are included in a particular machine 2100 will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 may include a network interface component or another suitable device to interface with network 2180. In further examples, communication components 2164 may include wired communication components, wireless communication components, cellular communication components, and other communication components to provide communication via other modalities. The device 2170 may be another machine or any of a wide variety of peripheral devices (e.g., a peripheral device coupled via a universal serial bus (USB)). For example, as noted above, machine 2100 may correspond to any one of the compute service manager 108 or the execution platform 110, and device 2170 may include the client device 114 or any other computing device described herein as being in communication with the network-based database system 102 or the cloud storage platform 104.

The various memories (e.g., 2130, 2132, 2134, and/or memory of the processor(s) 2110 and/or the storage unit 2136) may store one or more sets of instructions 2116 and data structures (e.g., software) embodying or utilized by any one or more of the methodologies or functions described herein. These instructions 2116, when executed by the processor(s) 2110, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 2180 or a portion of network 2180 may include a wireless or cellular network, and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2116 may be transmitted or received over network 2180 using a transmission medium via a network interface device (e.g., a network interface component included in the communication components 2164) and utilizing any one of several well-known transfer protocols (e.g., hypertext transfer protocol (HTTP)). Similarly, instructions 2116 may be transmitted or received using a transmission medium via coupling 2172 (e.g., a peer-to-peer coupling) to device 2170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2116 for execution by the machine 2100, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: creating a materialized table using a table definition, the table definition comprising a query on one or more base tables and a lag duration value, the lag duration value indicating a maximum time period that a result of a prior refresh of the query can lag behind a current time instance; determining a delta set for the one or more base tables, the delta set comprising at least one change applied to the one or more base tables since the prior refresh of the query; and merging the delta set with the materialized table to perform an incremental update of the materialized table.

In Example 2, the subject matter of Example 1 includes subject matter where the operations comprise: parsing the table definition to determine at least one intermediate materialized table, the creating of the materialized table depending on a result of the at least one intermediate materialized table.

In Example 3, the subject matter of Example 2 includes subject matter where the determining of the delta set comprises: determining at least one new row added to the one or more base tables since the prior refresh; and determining at least one deleted row removed from the one or more base tables since the prior refresh, the delta set comprising the at least one new row and the at least one deleted row.

In Example 4, the subject matter of Example 3 includes subject matter where the incremental update comprises: adding the at least one new row to the at least one intermediate materialized table; and removing the at least one deleted row from the at least one intermediate materialized table.

In Example 5, the subject matter of Examples 1~4 includes subject matter where the operations further comprise: translating the query of the materialized table into a plurality of data processing operations to obtain a query plan.

In Example 6, the subject matter of Example 5 includes subject matter where the operations further comprise: associating the plurality of data processing operations to one or more fragments, each of the one or more fragments indicative of an intermediate state of at least one of the plurality of data processing operations.

In Example 7, the subject matter of Example 6 includes subject matter where the operations further comprise: generating one or more intermediate materialized tables corresponding to the one or more fragments.

In Example 8, the subject matter of Example 7 includes subject matter where the operations further comprise: determining dependencies among the one or more intermediate materialized tables; generating a data definition language (DDL) log of the dependencies; and apply a graph rendering process to the DDL log of dependencies to generate a graph snapshot of the dependencies among the one or more intermediate materialized tables, the graph snapshot comprising a plurality of nodes corresponding to the one or more intermediate materialized tables.

In Example 9, the subject matter of Example 8 includes subject matter where the operations further comprise: detecting a refresh operation on the materialized table; and separating the plurality of nodes into subsets of nodes based on data processing account association.

In Example 10, the subject matter of Example 9 includes subject matter where the operations further comprise: configuring processing pipelines, each processing pipeline of the processing pipelines corresponding to a subset of nodes of the subset; and performing refreshes on corresponding intermediate materialized tables in each processing pipeline of the processing pipelines to complete the refresh operation on the materialized table.

Example 11 is a method comprising: creating a materialized table using a table definition, the table definition comprising a query on one or more base tables and a lag duration value, the lag duration value indicating a maximum time period that a result of a prior refresh of the query can lag behind a current time instance; determining a delta set for the one or more base tables, the delta set comprising at least one change applied to the one or more base tables since the prior refresh of the query; and merging the delta set with the materialized table to perform an incremental update of the materialized table.

In Example 12, the subject matter of Example 11 includes, parsing the table definition to determine at least one intermediate materialized table, and the creating of the materialized table depending on a result of the at least one intermediate materialized table.

In Example 13, the subject matter of Example 12 includes subject matter where determining the delta set further comprises: determining at least one new row added to the one or more base tables since the prior refresh; and determining at least one deleted row removed from the one or more base tables since the prior refresh, the delta set comprising the at least one new row and the at least one deleted row.

In Example 14, the subject matter of Example 13 includes subject matter where performing the incremental update further comprises: adding the at least one new row to the at least one intermediate materialized table; and removing the at least one deleted row removed from the at least one intermediate materialized table.

In Example 15, the subject matter of Examples 11-14 includes, translating the query of the materialized table into a plurality of data processing operations to obtain a query plan.

In Example 16, the subject matter of Example 15 includes, associating the plurality of data processing operations to one or more fragments, each of the one or more fragments indicative of an intermediate state of at least one of the plurality of data processing operations.

In Example 17, the subject matter of Example 16 includes, generating one or more intermediate materialized tables corresponding to the one or more fragments.

In Example 18, the subject matter of Example 17 includes, determining dependencies among the one or more intermediate materialized tables; generating a data definition language (DDL) log of the dependencies; and apply a graph rendering process to the DDL log of dependencies to generate a graph snapshot of the dependencies among the one or more intermediate materialized tables, the graph snapshot comprising a plurality of nodes corresponding to the one or more intermediate materialized tables.

In Example 19, the subject matter of Example 18 includes, detecting a refresh operation on the materialized table; and separating the plurality of nodes into subsets of nodes based on data processing account association.

In Example 20, the subject matter of Example 19 includes, configuring processing pipelines, each processing pipeline of the processing pipelines corresponding to a subset of nodes of the subset; and performing refreshes on corresponding intermediate materialized tables in each processing pipeline of the processing pipelines to complete the refresh operation on the materialized table.

Example 21 is a computer-storage medium comprising instructions that, when executed by one or more processors of a machine, configure the machine to perform operations comprising: creating a materialized table using a table definition, the table definition comprising a query on one or more base tables and a lag duration value, the lag duration value indicating a maximum time period that a result of a prior refresh of the query can lag behind a current time instance; determining a delta set for the one or more base tables, the delta set comprising at least one change applied to the one or more base tables since the prior refresh of the query; and merging the delta set with the materialized table to perform an incremental update of the materialized table.

In Example 22, the subject matter of Example 21 includes, the operations further comprising: parsing the table definition to determine at least one intermediate materialized table, the creating of the materialized table depending on a result of the at least one intermediate materialized table.

In Example 23, the subject matter of Example 22 includes subject matter where the operations for determining the delta further comprise: determining at least one new row added to the one or more base tables since the prior refresh; and determining at least one deleted row removed from the one or more base tables since the prior refresh, the delta set comprising the at least one new row and the at least one deleted row.

In Example 24, the subject matter of Example 23 includes subject matter where the operations for performing the incremental update further comprise: adding the at least one new row to the at least one intermediate materialized table; and removing the at least one deleted row removed from the at least one intermediate materialized table.

In Example 25, the subject matter of Examples 21-24 includes, the operations further comprising: translating the query of the materialized table into a plurality of data processing operations to obtain a query plan.

In Example 26, the subject matter of Example 25 includes, the operations further comprising: associating the plurality of data processing operations to one or more fragments, each of the one or more fragments indicative of an intermediate state of at least one of the plurality of data processing operations.

In Example 27, the subject matter of Example 26 includes, the operations further comprising: generating one or more intermediate materialized tables corresponding to the one or more fragments.

In Example 28, the subject matter of Example 27 includes, the operations further comprising: determining dependencies among the one or more intermediate materialized tables; generating a data definition language (DDL) log of the dependencies; and apply a graph rendering process to the DDL log of dependencies to generate a graph snapshot of the dependencies among the one or more intermediate materialized tables, the graph snapshot comprising a plurality of nodes corresponding to the one or more intermediate materialized tables.

In Example 29, the subject matter of Example 28 includes, the operations further comprising: detecting a refresh operation on the materialized table; and separating the plurality of nodes into subsets of nodes based on data processing account association.

In Example 30, the subject matter of Example 29 includes, the operations further comprising: configuring processing pipelines, each processing pipeline of the processing pipelines corresponding to a subset of nodes of the subset; and performing refreshes on corresponding intermediate materialized tables in each processing pipeline of the processing pipelines to complete the refresh operation on the materialized table.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
generating a source materialized table (MT) based on a table definition, the table definition comprising a query on one or more base tables, and a lag duration value, the lag duration value indicating a maximum time period that a result of a prior refresh of the query can lag behind a current time instance;
generating a log of changes posted to a plurality of intermediate MTs during execution of the query in a network-based database system, the query associated with the source MT that the intermediate MTs depend on;
rendering the log of changes into a dependency graph;
configuring a plurality of processing pipelines based on the dependency graph; and responsive to detecting an instruction for a refresh operation on the source MT, performing refreshes on one or more of the plurality of intermediate MTs in at least one of the plurality of processing pipelines to complete the refresh operation.

2. The system of claim 1, wherein the operations comprise:

partitioning the dependency graph into a plurality of sub-graphs based on an association of the changes to one or more user accounts of the network-based database system.

3. The system of claim 2, wherein the operations comprise:

configuring the plurality of processing pipelines to correspond to the plurality of sub-graphs.

4. The system of claim 1, wherein the operations comprise:

configuring a sub-graph of the plurality of sub-graphs to indicate dependencies among a subset of the plurality of intermediate MTs.

5. The system of claim 4, wherein the operations comprise:

configuring the subset with at least one composite MT, the at least one composite MT depending on at least two remaining MTs of the subset.

6. The system of claim 1, wherein the operations comprise:

performing the refreshes on the plurality of intermediate MTs in parallel in the plurality of processing pipelines to complete the refresh operation.

7. The system of claim 1, wherein the operations comprise:

generating the plurality of intermediate MTs based on a plurality of data processing operations in a query plan of the query.

8. A method comprising:

generating, by at least one hardware processor, a source materialized table (MT) based on a table definition, the table definition comprising a query on one or more base tables, and a lag duration value, the lag duration value indicating a maximum time period that a result of a prior refresh of the query can lag behind a current time instance;

generating, by the at least one hardware processor, a log of changes posted to a plurality of intermediate MTs during execution of the query in a network-based database system, the query associated with the source MT that the intermediate MTs depend on;

rendering the log of changes into a dependency graph;

configuring a plurality of processing pipelines based on the dependency graph; and responsive to detecting an instruction for a refresh operation on the source MT, performing refreshes on one or more of the plurality of intermediate MTs in at least one of the plurality of processing pipelines to complete the refresh operation.

9. The method of claim 8, further comprising:

partitioning the dependency graph into a plurality of sub-graphs based on an association of the changes to one or more user accounts of the network-based database system.

10. The method of claim 9, further comprising:

configuring the plurality of processing pipelines to correspond to the plurality of sub-graphs.

11. The method of claim 9, further comprising:

configuring a sub-graph of the plurality of sub-graphs to indicate dependencies among a subset of the plurality of intermediate MTs.

12. The method of claim 11, further comprising:

configuring the subset with at least one composite MT, the at least one composite MT depending on at least two remaining MTs of the subset.

13. The method of claim 8, further comprising:

performing the refreshes on the plurality of intermediate MTs in parallel in the plurality of processing pipelines to complete the refresh operation.

14. The method of claim 8, further comprising:

generating the plurality of intermediate MTs based on a plurality of data processing operations in a query plan of the query.

15. A computer-storage medium comprising instructions that, when executed by one or more processors of a machine, configure the machine to perform operations comprising:

generating a source materialized table (MT) based on a table definition, the table definition comprising a query on one or more base tables, and a lag duration value, the lag duration value indicating a maximum time period that a result of a prior refresh of the query can lag behind a current time instance;

generating a log of changes posted to a plurality of intermediate MTs during execution of the query in a network-based database system, the query associated with the source MT that the intermediate MTs depend on;

rendering the log of changes into a dependency graph;

configuring a plurality of processing pipelines based on the dependency graph; and responsive to detecting an instruction for a refresh operation on the source MT, performing refreshes on one or more of the plurality of intermediate MTs in at least one of the plurality of processing pipelines to complete the refresh operation.

16. The computer-storage medium of claim 15, the operations further comprising:

partitioning the dependency graph into a plurality of sub-graphs based on an association of the changes to one or more user accounts of the network-based database system.

17. The computer-storage medium of claim 16, the operations further comprising:

configuring the plurality of processing pipelines to correspond to the plurality of sub-graphs.

18. The computer-storage medium of claim 16, the operations further comprising:

configuring a sub-graph of the plurality of sub-graphs to indicate dependencies among a subset of the plurality of intermediate MTs.

19. The computer-storage medium of claim 18, the operations further comprising:

configuring the subset with at least one composite MT, the at least one composite MT depending on at least two remaining MTs of the subset.

20. The computer-storage medium of claim 15, the operations further comprising:

performing the refreshes on the plurality of intermediate MTs in parallel in the plurality of processing pipelines to complete the refresh operation.

21. The computer-storage medium of claim 15, the operations further comprising:

generating the plurality of intermediate MTs based on a plurality of data processing operations in a query plan of the query.

* * * * *